US007861255B2

(12) United States Patent
Edwards

(10) Patent No.: US 7,861,255 B2
(45) Date of Patent: Dec. 28, 2010

(54) MICROSTRUCTURED SURFACES FOR OPTICAL DISK MEDIA

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 844 days.

(21) Appl. No.: 11/805,309

(22) Filed: May 23, 2007

(65) Prior Publication Data

US 2008/0295125 A1 Nov. 27, 2008

(51) Int. Cl.
*G11B 3/70* (2006.01)

(52) U.S. Cl. .................................................... 720/718

(58) Field of Classification Search ....................... None
See application file for complete search history.

(56) References Cited

U.S. PATENT DOCUMENTS

| | | | | |
|---|---|---|---|---|
| 4,812,633 | A | 3/1989 | Vogelgesang et al. | |
| 5,470,691 | A * | 11/1995 | Arai et al. | 430/273.1 |
| 6,084,603 | A * | 7/2000 | Arai et al. | 347/2 |
| 6,638,692 | B1 | 10/2003 | Banal et al. | |
| 6,649,249 | B1 | 11/2003 | Engle et al. | |
| 6,977,052 | B1 | 12/2005 | Bahns et al. | |
| 7,137,134 | B2 * | 11/2006 | Takeshima et al. | 720/718 |
| 7,240,352 | B2 * | 7/2007 | Takeshima et al. | 720/718 |
| 2002/0001285 | A1 * | 1/2002 | Takeshima et al. | 369/290 |
| 2004/0085889 | A1 * | 5/2004 | Takeshima et al. | 369/283 |

FOREIGN PATENT DOCUMENTS

| | | |
|---|---|---|
| GB | 2 277 827 | 11/1994 |
| JP | 8-273331 | 10/1996 |
| JP | 8-287526 | 11/1996 |
| WO | WO 94/24665 | 10/1994 |

OTHER PUBLICATIONS

Co-pending U.S. Appl. No. 11/805,517 entitled "Topographical Surface Label Formed in an Optical Disk Substrate," Inventor: Jathan Edwards, filed May 23, 2007.

* cited by examiner

*Primary Examiner*—Mark Blouin
(74) *Attorney, Agent, or Firm*—Shumaker & Sieffert, P.A.

(57) ABSTRACT

The disclosure is directed to optical disks with a microstructured surface formed on a surface of the optical disk. The microstructured surface may be created to promote the adhesion and prevent the migration of a print material applied to the surface of the optical disk. The microstructured surface may be in the form of a plurality of wells or a plurality of discontinuous raised features in the surface. By forming a microstructured surface on the surface of the disk, the optical disk may not need an additional coating to receive the print material while also retaining the print material at a precise location on the surface. In addition, a plurality of standoff features may be formed in an outer surface of the optical disk to help prevent damage to the surface of the optical disk.

24 Claims, 18 Drawing Sheets

MICROSTRUCTURED SURFACES FOR OPTICAL DISK MEDIA

TECHNICAL FIELD

The invention relates to data storage media and, more particularly, optical data storage media.

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable) CD-ROM (CD-read only memory), DVD (digital versatile disk or digital video disk), DVD-RAM (DVD-random access memory), BluRay, HD-DVD (high definition digital versatile disk), and various other types of writable or rewriteable media, such as magneto-optical (MO) disks, phase change optical disks, and others. All optical disks utilize a laser to read data stored in the optical disk. Some newer formats for optical data storage disks are progressing toward smaller disk sizes and increased data storage density. For example, BluRay and HD-DVD media formats boast improved track pitches, increased storage through multiple data layers and increased storage density using blue-wavelength lasers for data readout and/or data recording.

All optical storage disks are manufactured with multiple steps. These steps may include forming an injection molded substrate, applying one or more thin film sets, and/or applying one or more cover layers. Spin-replication and/or roll-on embossing may be used to add the thin films or cover layers to the substrate. One or more stampers may be used in this process to create one or more data surfaces in the substrate or layers of the optical disk. Optical disks may also have a label on one surface of the disk.

In addition to the manufacturing steps described previously, optical disks may have a receptive layer on an outer surface that is configured to receive a print material from a printer. In this manner, the print material may adhere to the receptive layer. The print material may be designed by the user to create a label that identifies the optical disk or is a composition of artistic or photographic images. Types of printers include inkjet printers that apply ink droplets and thermal printers that apply a thermal layer to the outer surface of the optical disk.

SUMMARY

The disclosure is directed to optical disks with a microstructure formed on a surface of the optical disk to improve the quality of the printed label and improve immunity to surface abrasion. In one aspect, the microstructure may be created to promote the adhesion and reduce the lateral migration of a print material applied to the surface of the optical disk. The microstructure may be in the form of a plurality of wells or a plurality of discontinuous raised features in the surface. An optical disk with a microstructure formed into the outer surface of the disk for receiving a print material may eliminate the need for an additional coating to receive the print material. In addition, the microstructure may retain or confine the print material at a precise location on the surface to reduce damaged labels.

In a second aspect, a plurality of protruding standoff features may be created to reduce or prevent scratches in an outer surface of optical disks containing the standoff features. In regard to the label side surface of the disk, scratches in labels may degrade aesthetics or information of the label. In regard to the data access side, scratches in optically transparent surface may interfere with the retrieval of data from the optical disk. In either case, the plurality of standoff features protruding from the outer surface of the optical disk need cover only a small fraction of the outer surface area in order to provide scratch resistance. Being very small and sparse, the standoff features may not be noticeable to the naked eye, but standoff features with heights of a few micrometers covering a small fraction of the disk surface may create an anti-scratch mechanism that protects the disk surface. In combination of first and second aspects, the standoff features providing scratch resistance may be combined with the microstructured surface designed for improved print reception.

In one embodiment, the invention provides an optical disk that includes a disk-shaped substrate, a data surface, and a microstructured surface configured to accept a print material.

In another embodiment, the invention provides an optical disk that includes a disk-shaped substrate, a data surface, a microstructured surface configured to accept a print material, and a print material adhered to the microstructure. The microstructured surface reduces migration of the print material across the microstructured surface.

In another embodiment, the invention provides a method including molding a disk-shaped substrate of an optical disk, creating a data surface for the optical disk, and forming a microstructured surface into an outer surface of the optical disk with a stamper having an inverse microstructure. The microstructured surface is configured to accept a print material.

In an additional embodiment, the invention provides an optical disk that includes a disk-shaped substrate, a data surface, and a plurality of standoff features formed in an outer surface of the disk at the same radial position of at least a portion of the data surface. The plurality of standoff features protrude from the disk-shaped substrate and protect the outer surface from damage.

The invention may provide one or more advantages. For example, the microstructured surface may accept a print material to eliminate the need for an additional coating of receptive material on the optical disk before printing can occur. The microstructured surface may also contain the print material to prevent migration, e.g., lateral migration, of the print material before it has cured or dried on the optical disk. In addition, a plurality of standoff features may be formed in an outer surface of the optical disk to prevent the outer surface of the optical disk from contacting another surface and incurring scratches to the outer surface due to the planar contact abrasion.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
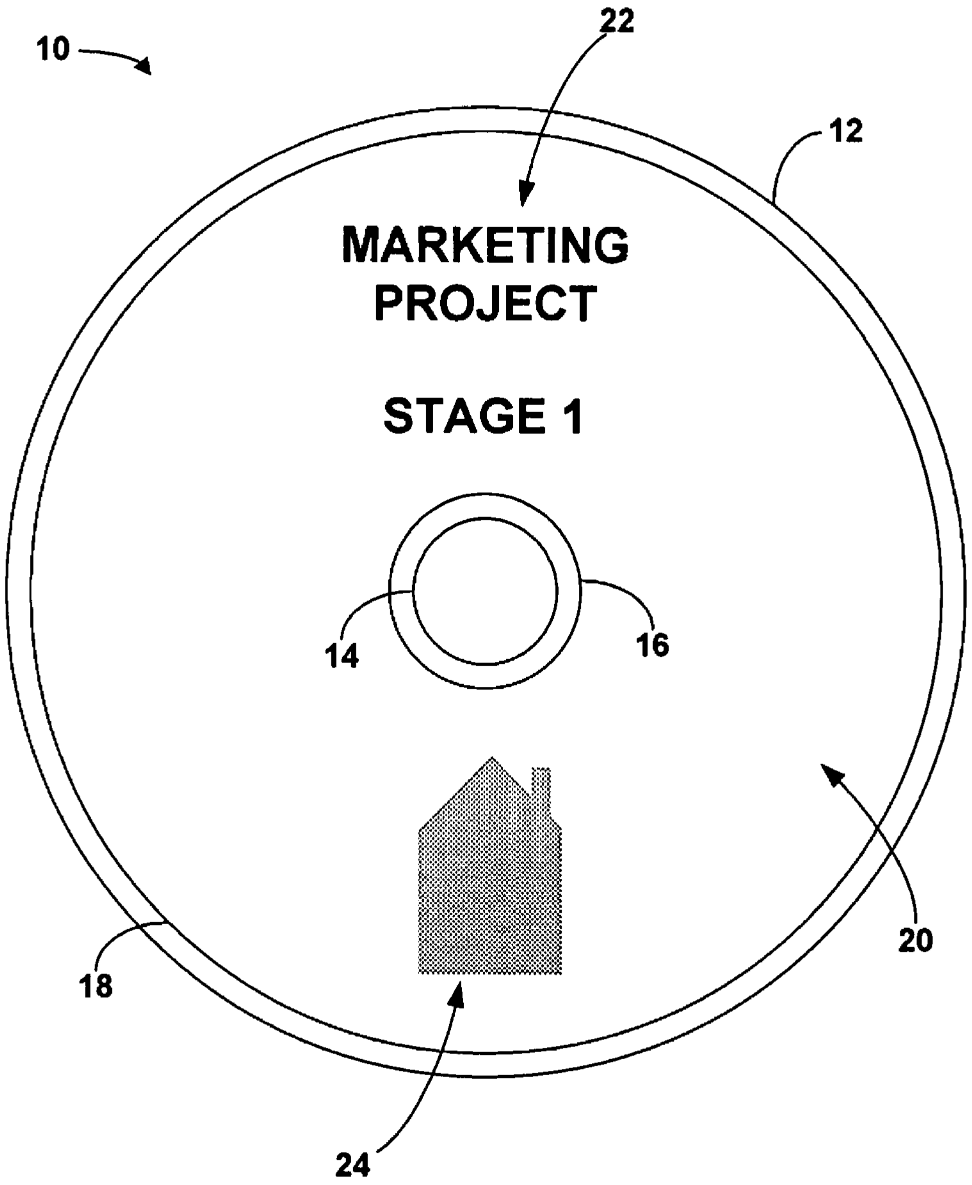
FIG. 1 is a conceptual view of an example optical disk with a print material applied to a microstructured surface created in a surface of the optical disk.

Optical disks are commonly used to store data and transfer that stored data between computing systems. Since optical disks are removable media, most optical disks include a factory applied standard label, which identifies the optical disk to the user. Generally, the standard label includes information such as the manufacturer's logo and/or media type (e.g. 16X DVD-R). Some optical disks are printable optical media which may not include a label or includes a minimal information label at the very inner radius of the disk. The minimal information label may leave a majority of the label surface for user printable information. The user printable information, e.g., the label, may include any combination of letters, numbers, colors, images, shapes, or artwork that either provides information regarding the content of the optical disk or decoration that is aesthetically pleasing. The user printable label may comprise any type of print material that can be applied to a surface of the optical disk, such as ink from an inkjet printer or a thermally transferred layer from a thermal printer. Since print materials do not adhere well to a smooth surface of an optical disk, an inkjet receptive coating or thermally receptive coating is typically applied to the optical disk so that the optical disk can retain the print material.

Optical disks described herein include a microstructured surface created in an outer surface of the optical disk to eliminate the need for a receptive coating to be applied to the optical disk before a standard label or a user printable label can be created on the optical disk. The microstructured surface may be created into an outer surface of a layer already needed for the completion of the optical disk. Different features may be used in the microstructured surface, such as a plurality of wells or a plurality of discontinuous raised features which provide an acceptable surface for the print material to adhere to. In this manner, time and expense of optical disk manufacture may be reduced by eliminating the need for a print receptive layer on the disk. The expense may include material costs of another layer and the capital costs of machines to apply the print receptive layer to the disk. The microstructured surface may also provide other advantages to the printing process, such as preventing the lateral migration of the print material, e.g., smearing of liquid inks, across the surface of the optical disk. The microstructured surface may be beneficial to printing at any time during the life of the optical disk, such as at the time of disk printing and at later potential exposures of the printed surface to moisture.

In addition, or in the alternative, to supporting the application of print materials to create a label on an optical disk, the outer surface of the optical disk may include a plurality of standoff features which protrude from the outer surface. The standoff features may help to reduce scratches to the surface of the optical disk caused by rubbing or contact against flat surfaces. The standoff features may be located on the same surface as the label or the data access surface which a laser passes through when interacting with the data layers of the disk. When standoff features cover less than one percent of the surface area of the disk, for example, they may not interfere with the aesthetics of the printed label or the function of laser interaction with the data layer of the disk. The standoff features may be placed in locations that are coincident with the radial position of the data recording zone of the optical disk.

FIG. 1 is a conceptual view of an example optical disk 10 with a print material applied to a microstructured surface created in the optical disk. As shown in FIG. 1, optical disk 10 defines outer radius 12 and inner radius 14. The area of optical disk 10 that may be used to apply label 20 lies between outer radius 18 and inner radius 16. Label 20 may be a standard label or user printable label that includes any combination of letters, numbers, symbols, shapes, and artwork. In the example of FIG. 1, label 20 is shown as including words 22 and artwork 24. The opposing surface of optical disk 10 (not shown) allows light to be transmitted to the data surface within the optical disk (not shown).

Optical disk 10 may be any type of optical disk that is configured to store digital data. While optical disk 10 may include data stored on the disk during manufacture, e.g., stamped or formed into a surface of the disk, the disk may not need to store data at all times. For example, optical disk 10 may include a writable or re-writable data surface in which a user may modify to store desired data. Optical disk 10 may be manufactured with a blank data surface, or partially blank data surface, in which the user may write data to the disk as needed. These writable or re-writable data surfaces may be constructed using a dye or phase change recording stack of materials commonly used in the art that can be modified by a write laser of a compatible disk drive. Therefore, a data surface or data layer, as describe herein, may not necessarily contain stored data at all times after manufacture.

Label 20 may be applied to all or only a portion of the outer surface of optical disk 10. Label 20 is located at the same radial position of optical disk 10 with at least a portion of the data recording zone of the optical disk. That is to say, label 20 is at least partially radially coincident and parallel with the data surface that includes the data recording zone, but on the opposing side of the optical disk. Generally, label 20 is located between inner radius 16 and outer radius 18. Label 20 is located in an area of the disk that radially coincides with the data recording zone or data layer at a different depth of optical disk 10. Alternatively, label 20 may be located between inner radius 14 and inner radius 16 and/or between outer radius 12 and outer radius 18 in addition to being located between inner radius 16 and outer radius 18. Therefore, label 20 may be located on an entire surface of optical disk 10.

Label 20 may also include any type of text, numbers, images, symbols, or artwork that a manufacturer or user may desire. Optical disk 10 is shown with label 20 that includes words 22 and artwork 24. Words 22 may include "Marketing Project Stage 1," which is an example of information that identifies the data content in optical disk 10. In addition, artwork 24 may include an image of a house, which is an example of artwork that identifies the marketing project as being related to real estate. Words 22 and artwork 24 are provided only as an example of label 20, and may include any identifying marks, indicia or design desired by the user.

The microstructured surface that accepts label 20 may cover the entire area between inner radius 16 and outer radius 18. However, elements of label 20 do not need to cover the entire microstructured surface. Instead, the microstructured surface may be transparent or opaque. In either case, a default color, e.g., white, may be present in the microstructured surface when no print material is present. A printer may then apply print material to specific locations of the microstructured surface to create elements such as words 22 and artwork 24, while the remaining area of label 20 may remain without print material. In any case, the content of label 20 may have a primary purpose of identifying the content of data stored on optical disk 10. It is noted that label 20 may include print material applied to the microstructured surface on more than one occasion. For example, the manufacturer may apply a standard label to a portion of optical disk 10 and a user may apply the user printable label to another portion of the optical disk at a later time. In some cases, the user printable label may overlap a portion of the standard label applied to the microstructured surface by the manufacturer.

Optical disk 10 may be constructed to standard dimensions or custom dimensions, depending upon the intended use of the optical disk. Where optical disk 10 is a CD, DVD, HD-DVD, BluRay, or another similar format, outer radius 12 may be 60 millimeters (mm) and inner radius 14 may be 7.5 mm. In addition, inner radius 16 may be 25 mm while outer radius 18 may be 58 mm. However, optical disk 10 may be constructed with any dimensions desired by the user and readable by a compatible optical disk drive. For example, outer radius 12 may be 40 mm with inner radius 14 being 7.5 mm. Corresponding inner radius 16 may be 25 mm and outer radius 18 may be 38 mm. This example smaller optical disk 10 may be appropriate for applications which require a minimal amount of data storage and extensive distribution of the optical disk.

Figure 2:
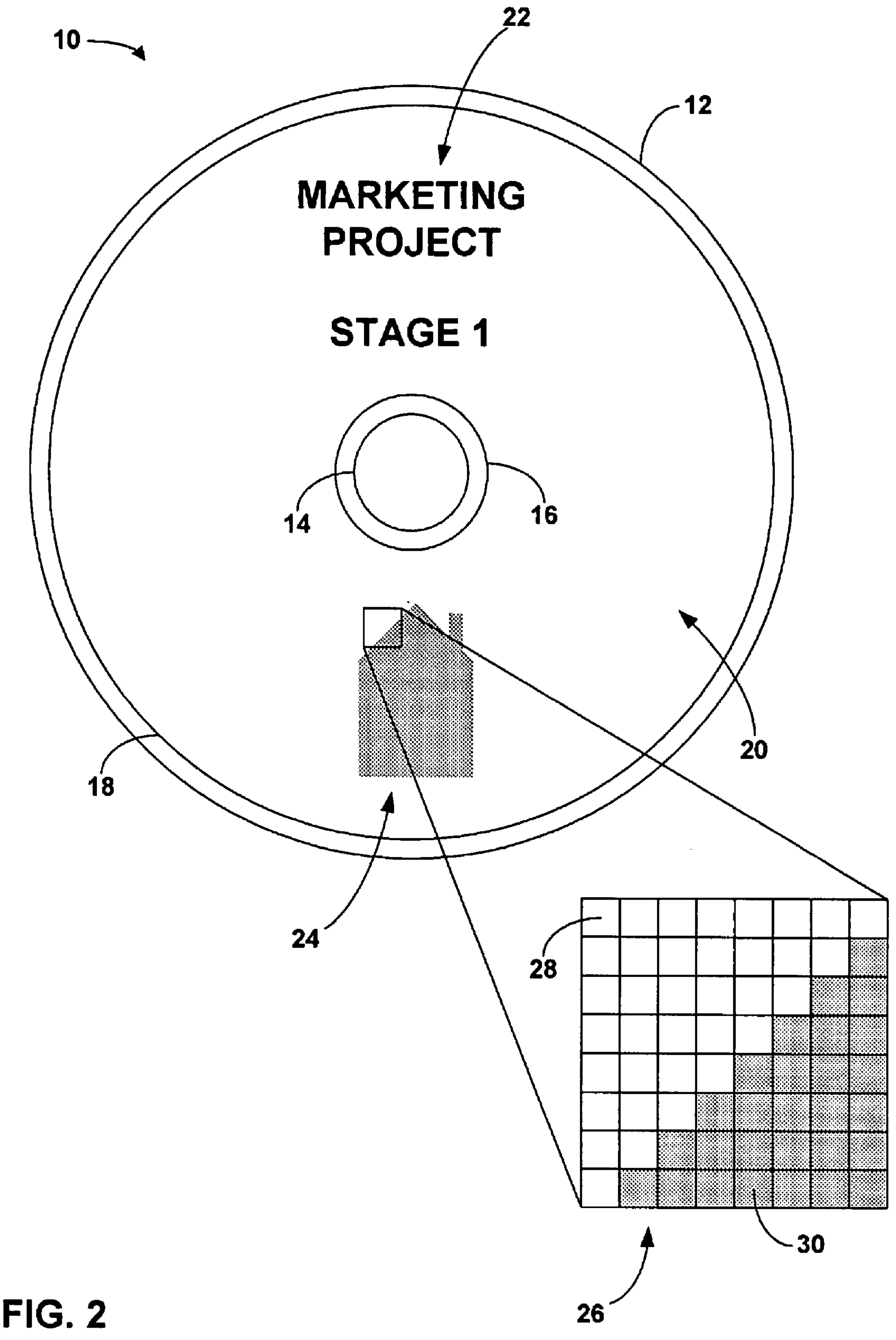
FIG. 2 is a magnified view of example features of the microstructured surface that contains the print material to retain the intended label artwork of the optical disk.

FIG. 2 is a magnified view of example features of a microstructured surface that contains a print material that creates the intended label artwork of the optical disk 10 of FIG. 1. As shown in FIG. 2, optical disk 10 includes label 20 between inner radius 16 and outer radius 18. Label 20 is applied to a microstructured surface formed in the outer surface of optical disk 10, as shown in magnified subsection 26. A subsection of microstructured surface 26 is magnified to illustrate the features of the microstructured surface not normally visible in optical disk 10. Microstructured surface 26 includes the plurality of wells formed by the entire microstructured surface of optical disk 10. Wells 28 do not contain any of the print material while wells 30 contain the print material that defines artwork 24.

As shown in the subsection of microstructured surface 26, the top view of wells 28 and wells 30 illustrates that the microstructured surface contains features configured in a grid formation. While this example displays an X-Y tiling of wells following Cartesian coordinates, alternative well structure having other patterns such as hexagonal or triangular are also possible. Microstructured surface 26 segregates the surface of optical disk 10 into wells, shown as wells 28 and 30. Wells 28 are substantially similar to wells 30, but wells 30 contain a print material that defines artwork 24. Conversely, wells 28 are empty and do not contain any print material. The subsection of microstructured surface 26 is representative of the entire microstructured surface of optical disk 10 formed between inner radius 16 and outer radius 18. However, the microstructured surface may be varied over the surface of optical disk 10 as required for the intended printing application for label 20.

Wells 28 and 30 allow microstructured surface 26 to prevent the print material from migrating laterally across the outer surface of optical disk 10. Print material commonly changes phases during the printing of label 20. When the print material is applied to optical disk 10, the print material may be liquid, flowable, or otherwise malleable such that the material can be transferred to the surface of the disk. There is usually a time period between the application of the print material and the curing or drying of the print material in which the material may migrate to another location of the surface (e.g., smearing). For example, ink deposited on the surface of optical disk 10 may flow across the surface if the surface is tilted or touched by an object such as an adjacent disk in stack. However, microstructured surface 26 and defined features may help to prevent any disturbances to the print material before the material has time to cure on the surface of optical disk 10. In addition, microstructured surface 26 may reduce or prevent migration of the print material due to moisture, heat, or other environmental conditions that may affect the phase of label 20 during the life of the label on optical disk 10.

Essentially, wells 28 and 30 may act as a matrix to receive print material, and the matrix may vary based upon the manner in which the print material is to be applied to the microstructured surface 26. For example, an inkjet printer may produce ink droplets that are each deposited into a single well. In other examples, one ink droplet may be larger than wells 28 and 30, such that a single droplet of ink is separated into several wells 30. Alternatively, a thermal layer may be applied to microstructured surface 26 and held in place by the ridges of wells 28 and 30. In any event, the size of wells 30 in microstructured surface 26 may be predetermined by the print material and the printer that applies the material. Microstructured surface 26 with smaller wells 28 and 30 may allow for a greater retained resolution of elements in label 20. However, different print materials may have a range of well 28 and 30 size which best accepts the specific print material. For one example, well spacings may need to be less than or equal to the standard print resolution in order not to deteriorate the resolution of the printed image. For another example, well volume may be equal to or greater than the print material droplet volumes for full density images.

In some examples, microstructured surface 26 may be used in conjunction with a print material and a print material receptive layer. In other words, a print material receptive layer may first be applied to microstructured surface 26. Microstructured surface 26 may reduce or prevent the print material receptive layer from migrating laterally across the surface of the optical disk. Once the print material receptive layer has been cured or otherwise readied to accept a print material, the print material may be applied to the print material receptive layer. In this manner, the combination of microstructure surface 26, print material receptive layer, and print material may increase the durability or quality of application of label 20 to optical disk 10.

Figure 3A:
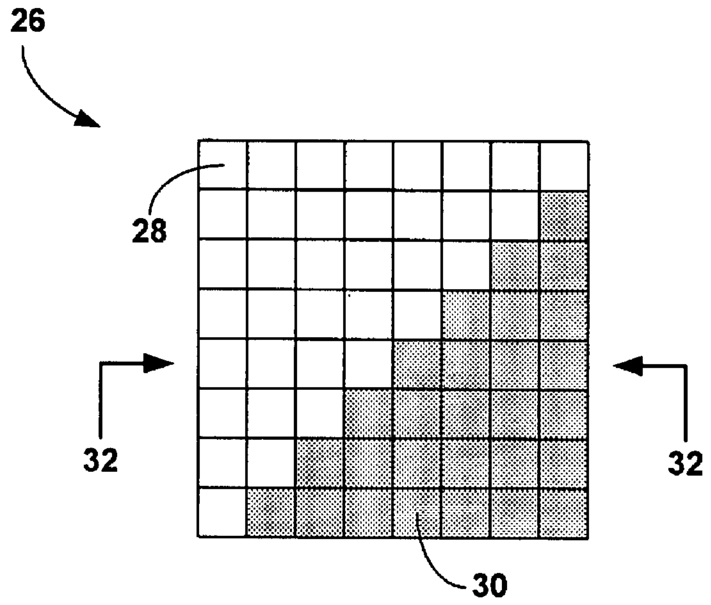
FIG. 3A is a top view of an example subsection of a microstructured surface defining a plurality of wells.

FIG. 3A is a top view of an example subsection of microstructured surface 26 defining a plurality of wells. As shown in FIG. 3A, microstructured surface 26 includes empty wells 28 and partially filled wells 30. Wells 28 do not include a print material, but wells 30 include the print material. Wells 28 and 30 may not be visible to the naked eye, and the edge in the artwork created between wells 28 and 30 may also not be visible due to the small dimensions of the wells. Row 32 is indicated by arrows pointing to the row. Row 32 is further identified in FIG. 3B.

Figure 3B:
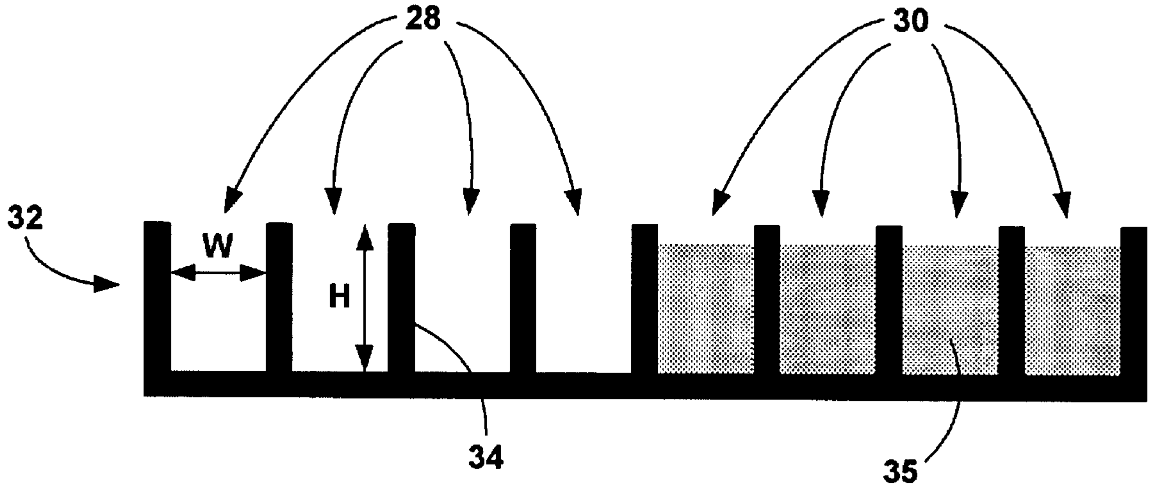
FIG. 3B is a side view of an example row of a microstructured surface defining a plurality of wells holding ink from an inkjet printer.

FIG. 3B is a side view of an example row 32 of a subsection of microstructured surface 26 defining a plurality of wells holding ink from an inkjet printer. Wells 28 and 30 are divided by walls 34. Walls 34 are features or elements of microstructured surface 26 that define wells 28 and 30. Each of wells 28 and 30 have a width W and height H determined by walls 34 of the microstructured surface. Wells 30 are shown as containing print material 35 of label 20.

Microstructured surface 26 may be of sufficiently small dimension as to be unnoticeable to the naked eye. In this manner, microstructured surface 26 may be designed to achieve advantages of improved label printing without otherwise changing the aesthetics of optical disk 10. Microstructured surface 26 defines wells 28 and 30 based upon height H of walls 34 and the width W between each wall. Width W may be generally between 0.5 micrometers (μm) and 50 μm. More specifically, width W may be between 1 μm and 10 μm. Height H may be between approximately 0.1 μm and approximately 50 μm. In some examples, height H may be between approximately 0.5 μm and approximately 5 μm. The dimensions of W and H may vary based upon the print material to be used and the type of printer that may be used to apply the print material. Dimensions W and H of microstructured surface 26 may also vary based upon the desired resolution of label 20 content. For example, height H may be greater for cases or disks where ink is applied to microstructured surface 26 than the height H of walls 34 for disks where a thermal layer is applied to the microstructured surface. In any case, wells 28 and 30 are defined by walls 34 which are features of microstructured surface 26. Features, such as walls 34, may have a spacing or distance between them to describe the frequency of features across microstructured surface 26. This spacing may be between 0.5 μm and 200 μm, depending on the application of optical disk 10.

In alternative examples, wells 28 and 30 may not have a substantially flat bottom as described above. Instead, wells 28 and 30 may further contain dimples or other small features slightly raised or sunk into microstructured surface 26. These dimples would be on a smaller scale than wells 28 and 30 or walls 34 and be used to provide an uneven surface that may help to promote the adhesion of the print material. Cross-hatches, swirls, or other elements may be defined by microstructured surface 26 instead of dimples.

In preferred examples, the microstructured surface may be created according to a resolution of label 20 that may be created by the printer. In the example of an inkjet printer, the inkjet printer may be described as being able to produce a certain number of dots per square inch (dpi) of ink to microstructured surface 26 of optical disk 10. A 635 dpi image resolution produced by a printer results in a 40 μm pixilated dot spacing within the image. Microstructured surface 26 may be formed to include wells 28 every 4 μm to prevent moiré type interference that may be due to comparable features of microstructured surface 26 to the pixilated dot spacing of the ink or print material. In this manner, a ratio of 10:1 (pixilated dot spacing to microstructured surface feature distance) may be preferred. However, a ratio between 5:1 and 50:1 may be applicable in varying application of optical disk 10.

The print material 35 may be a liquid, such as an ink. However, print material 35 may also be a thermal layer applied to microstructured surface 26. In the case where print material 35 comprises a thermal layer, a thermal printer may heat the thermal layer, configured as label 20, from a solid to a more malleable material. The heated thermal layer is applied by the thermal printer to microstructured surface 26. The thermal layer may settle into wells 30 as walls 34 prevent the thermal layer from shifting or migrating from its initial position before the thermal layer can cool and cure to microstructured surface 26. In thermal printing applications, walls 34 may have a shorter height H than with inkjet printing so that the thermal layer can adhere to the bottom of wells 30. The adhesion and quality of other types of print materials may also benefit from microstructured surface 26.

While wells 28 and 30 are shown to be substantially rectangular, the wells may take on any shape that may be beneficial to the application of print materials. In some examples, wells 28 and 30 may be tapered such that the width W is greater at the top of walls 34 than at the bottom of the walls. Accordingly, walls 34 may be tapered to accommodate these tapered well shapes. In other examples, wells 28 and 30 may be defined by greater or fewer numbers of walls 34. In particular, wells 28 and 30 may be shaped as triangles, pentagons, hexagons, or any other polygon or amorphous shape defined by the arrangement of walls 34 in microstructured surface 26. Microstructured surface 26 may also define wells 28 and 30 by randomly located walls 34 in some alternative examples.

Figure 4A:
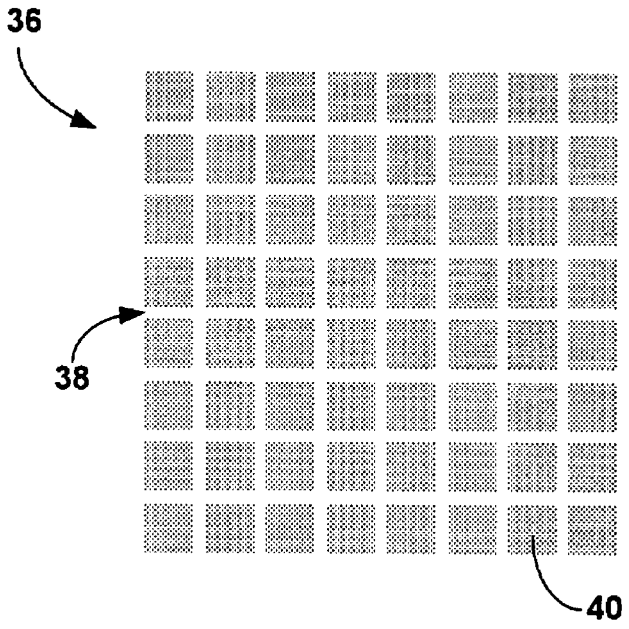
FIGS. 4A and 4B are top views of an example subsection of a microstructured surface defining a plurality of discontinuous raised features.
Figure 4B:
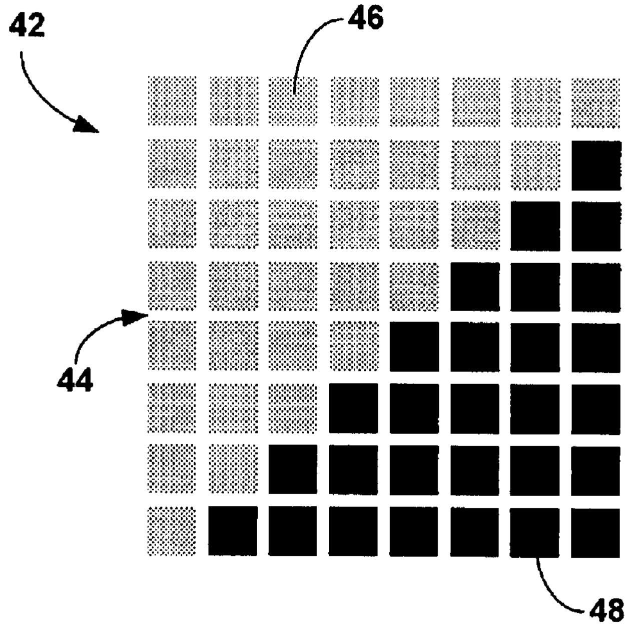

FIGS. 4A and 4B are top views of an example subsection of a microstructured surface defining a plurality of discontinuous raised features. As shown in FIG. 4A, a subsection of microstructured surface 36 may cover the outer surface of optical disk 10. Microstructured surface 36 includes channels 38 and raised features 40. Raised features 40 allow the print material to adhere to microstructured surface 26 while channels 38 prevent the print material from shifting across microstructured surface 36. Channels 38 prevent the print material from migrating to other raised features 40. Microstructured surface 36 may represent an inverse structure to microstructured surface 26 of FIGS. 2, 3A and 3B.

Microstructured surface 36 provides a surface to which a print material can adhere, while reducing lateral migration of the print material across the surface of optical disk 10 before the material cures. If the print material is an ink applied by an inkjet printer, the ink is prevented from migrating to other raised features 40 of the surface by being locked into channels 38 below the raised features. In the case that the print material is a thermal layer, the heater thermal layer can bond to raised features 40 and slightly sink into channels 38. The edges of raised features 40 provide resistance to the curing thermal layer as it cools to promote adhesion and prevent migration of the thermal layer across the raised features.

Similar to microstructured surface 26, microstructured surface 36 may be unnoticeable to the naked eye. Accordingly, microstructured surface 36 may be designed for the advantages of printing label 20 without changing the aesthetics of optical disk 10. Microstructured surface 36 defines raised features 40 and channels 38 which separate the raised features. Depth of channels 38 may be between approximately 0.1 μm and approximately 50 μm. In some examples, the depth of channels 38 may be between approximately 0.5 μm and approximately 5 μm. Raised features 40 have a width generally between approximately 0.5 micrometers (μm) and approximately 50 μm. More specifically, the width of raised features 40 may be between approximately 1 μm and approximately 10 μm. The dimensions of channels 38 and raised features 40 may vary based upon the print material to be used and the type of printer that may be used to apply the print material. In any case, raised features 40 define channels 38 which are features of microstructured surface 26. Raised features 40 may have a spacing or distance between them to describe the frequency of features across the microstructured surface 26. This spacing may be between approximately 0.5 μm and approximately 200A μm, depending on the application of optical disk 10.

In alternative examples, raised features 40 may not be substantially flat as described above. Raised features 40 may contain dimples or other small features slightly raised or sunk into the raised features. These dimples would be on a smaller scale than raised features 40 or channels 38 and be used to provide an uneven surface that may help to promote the adhesion of the print material. Cross-hatches, swirls, or other elements may be defined by microstructured surface 26 instead of dimples.

In preferred examples, microstructured surface 36 may be created according to a resolution of label 20 that may be created by the printer of the manufacturer or the user. In the example of an inkjet printer, the inkjet printer may be described as being able to produce a certain number of dots per square inch (dpi) of ink to microstructured surface 36 of optical disk 10. Standard printer settings include 150, 300, 600, and 1200A dpi, but are not limited to these example values. For a numerical example, if a printer produced a 635 dpi resolution image, this would result in a 40 μm pixilated dot spacing within the image. Microstructured surface 36 may be formed to include raised features every 4 μm to prevent moiré type interference that may be due to comparable features of microstructured surface 36 to the pixilated dot spacing of the ink or print material. In this manner, a ratio of 10:1 (pixilated dot spacing to microstructured surface feature distance) may be preferred. However, a ratio between 5:1 and 50:1 may be applicable in varying application of optical disk 10.

While raised features 40 are shown to be substantially square, the wells may take on any shape that may be beneficial to the application of print materials. In some examples, raised features 40 may be shaped as triangles, pentagons, hexagons, or any other polygon or amorphous shape defined by the arrangement channels 38 in microstructured surface 36. Microstructured surface 36 may also define raised features 40 by randomly located channels 38 in some alternative examples. In alternative examples, some of raised features 40 may have a greater height than other raised features. Staggering the height of raised features 40 may help to further promote print material adhesions and prevent migration.

FIG. 4B shows microstructured surface 42 with channels 44, unused raised features 46, and printed raised features 48. Microstructured surface 42 is substantially similar to microstructured surface 36 of FIG. 4A, except that a print material has been printed to microstructured surface 42. The discontinuous raised features 48 have print material adhered to the features while channels 44 prevent the printed material from migrating to raised features 46 when the material has not yet cured. While channels 44 may become filled with some of the printed material, the printed material within the channels may not be noticeable to the naked eye.

Figure 5A:
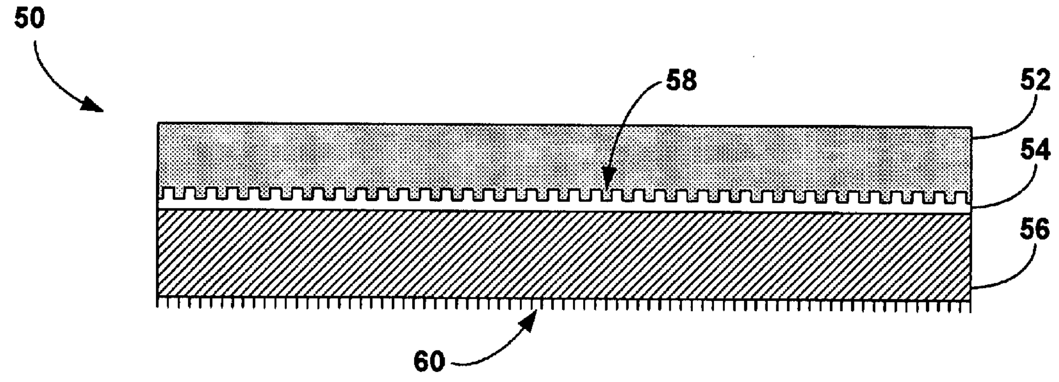
FIGS. 5A-5C are cross-sectional views of exemplary optical disks with microstructured surfaces.
Figure 5B:
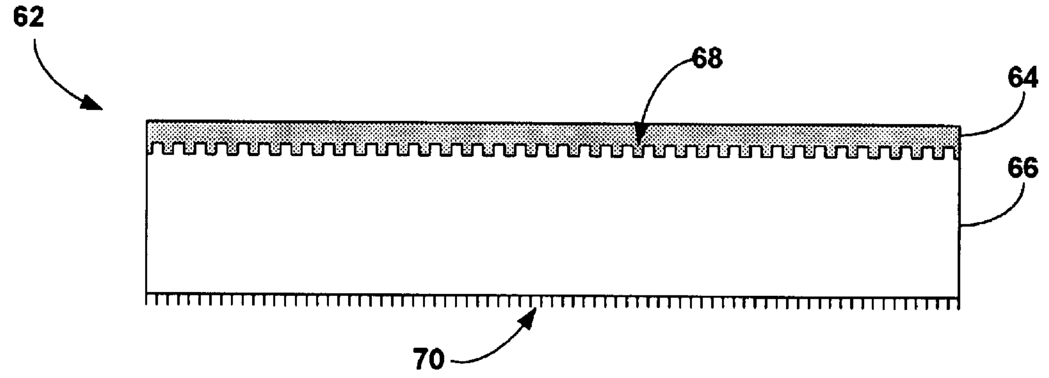
Figure 5C:
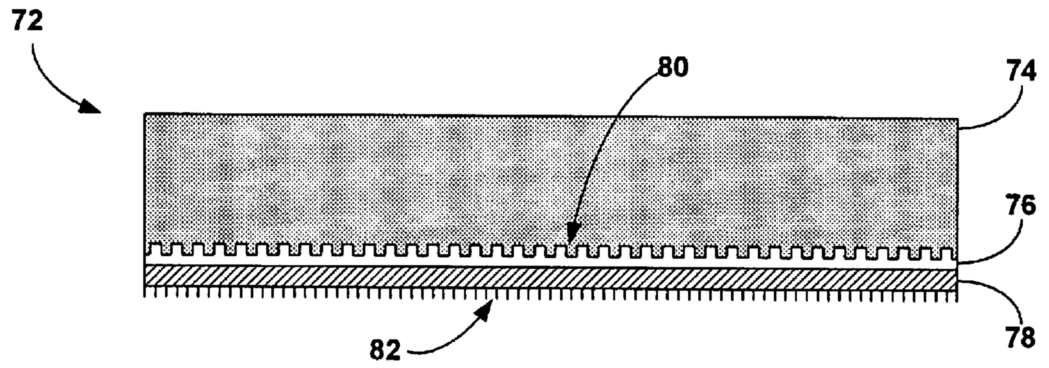

FIGS. 5A-5C are cross-sectional views of exemplary optical disks with microstructured surfaces. Optical disks 50, 62, and 72 are embodiments of optical disk 10 of FIG. 1. As shown in FIG. 5A, optical disk 50 includes data substrate 52, thin films 54, and dummy substrate 56, and may be similar to a DVD or HD-DVD format optical disk. Data substrate 52 includes data surface 58 molded into the substrate. Thin films 54 may include a reflective element or diffractive element in addition to a bonding layer for adhering dummy substrate 56. Dummy substrate 56 includes microstructured surface 60 formed into the outer surface of the substrate. Microstructured surface 60 may be similar to microstructured surfaces 26 or 36.

Data is read from data surface 58 through data substrate 52. Therefore, the outer surface of data substrate 52 must be optically transparent for a laser to interrogate data surface 58. The outer surface of dummy substrate 56 may not need to be optically transparent because data surface 58 is not read through dummy substrate 56. A label can then be applied to microstructured surface 60 to identify the content of the data stored in optical disk 50. While microstructured surface 60 is shown as covering the entire outer surface of dummy substrate 56, the microstructured surface may, alternatively, only be formed over only a portion of the substrate surface. For example, the portion may only include the range of dummy substrate 56 between the inner and outer radii that includes data surface 58.

Alternatively, the data surface may not be located as surface topography in data substrate 52. Thin film 54 may include one or more layers that include a dye or phase change recording layer that allows data to be written to the data surface with a laser. In this manner, optical disk 50 may not contain data until after a user records data to the thin film 54. A label may be printed to microstructured surface 60 before or after data is stored on data surface 58. In some examples, microstructured surface 60 may be capable of accepting multiple labels to allow a user to change or append the information of optical disk 50.

As shown in FIG. 5B, optical disk 62 includes substrate 66 and thin film 64. Data surface 68 and microstructured surface 70 are formed into substrate 66. Thin film 64 may be a cover layer which protects data surface 68 while remaining at least partially optically transparent to allow a laser to interrogate the data surface. Data surface 68 may include a reflective layer or coating which allows the laser to determine the features within data surface 68. Microstructured surface 70 is formed on the outer surface of substrate 66 in order to print a label on optical disk 62. Microstructured surface 70 may be similar to microstructured surfaces 26 or 36. Optical disk 62 may be an example of a BluRay format optical disk.

Alternatively, data surface 68 may not be located as surface topography in substrate 66. An additional data surface layer may be included between substrate 66 and thin film 64. The data surface layer may include a dye or phase change recording layer that allows data to be written to the data surface with a laser. In this manner, optical disk 62 may not contain data until after a user records, or stores, data within the thin film 64. A label may be printed to microstructured surface 70 before or after data is stored on data surface 68. In some examples, microstructured surface 70 may be capable of accepting multiple labels to allow a user to change the identification of optical disk 60.

FIG. 5C shows optical disk 72 which includes data substrate 74, thin films 76, and sealing layer 78. Data surface 80 is formed into data substrate 74 while microstructured surface 82 is formed into sealing layer 82. A reflective layer may also be added to data surface 80 to allow a laser to read the features of the data surface through the optically transparent data substrate 74. Sealing layer 78 does not need to be transparent, so microstructured surface 82 is formed to accept a print material which forms a label. Microstructured surface 82 may be similar to microstructured surfaces 26 or 36. Optical disk 72 may be in the format of a CD.

In some examples of optical disk 72, data surface 80 may not be located in data substrate 74. Instead, an additional data surface layer may be included between data substrate 74 and thin film 76. The data surface layer may include a recordable dye or phase change capability that allows data to be written to the data surface with a laser. In this manner, optical disk 72 may not contain data until after a user writes, or stores, data within the data surface layer. A label may be printed to microstructured surface 82 before or after data is stored on data surface 80. In some examples, microstructured surface 82 may be capable of accepting multiple labels to allow a user to change or append the information of optical disk 72.

Figure 6A:
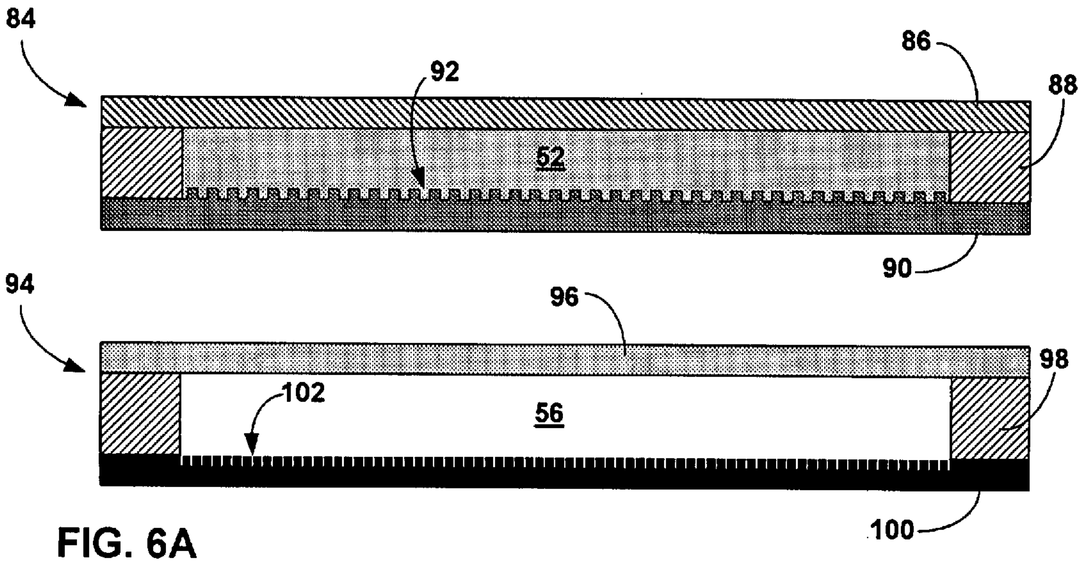
FIGS. 6A-6C are cross-sectional views of exemplary stampers for creating substrates of optical disks.
Figure 6B:
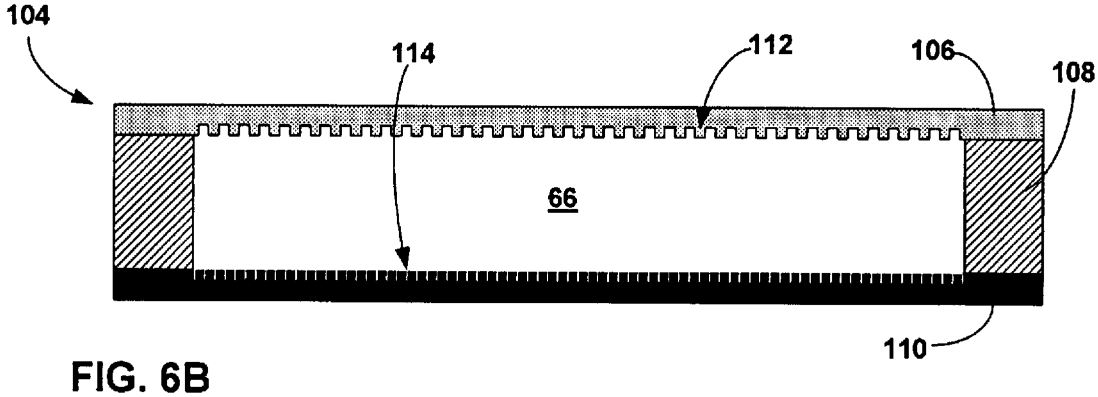
Figure 6C:
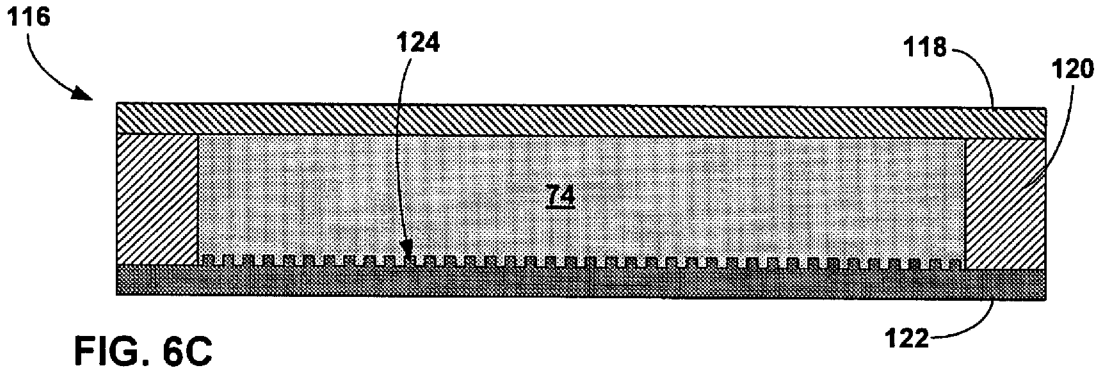

FIGS. 6A-6C are cross-sectional views of exemplary mold with stampers for creating substrates of optical disks 50, 62, and 72. The substrates described herein may be formed of any type of optically transparent material such as polycarbonate. FIGS. 6A-6C provide example techniques for creating substrates of optical disks. Other techniques for injection molding, mold tooling, cover layer bonding, or creating a substrate of an optical disk may also be used in alternative examples. As shown in FIG. 6A, substrates 52 and 56 of optical disk 50 are created through an injection molding process. Mold 84 includes mirror block 86, cavity ring 88, stamper 90, and data substrate 52. Stamper 90 includes an inverse data surface 92 which creates the desired data surface in data substrate 52. Mold 84 may be used to create multiple substrates 52. Mold 84 is put together by placing cavity ring 88 between block 86 and stamper 90. Stamper 90 may be produced with a master stamper having features identical to the data surface formed in data substrate 52. Once mold 84 is complete, substrate material is injected into the mold to form data substrate 52. Mold 84 may then be opened to remove data substrate 52. Block 86 may be a stamper with a smooth surface transparent to light.

Mold 94 is used to form the second substrate of optical disk 50, dummy substrate 56. Mold 94 includes block 96, cavity ring 98, stamper 100, and dummy substrate 56. Stamper 100 includes an inverse microstructured surface 102 which creates the microstructured surface within dummy substrate 56. Mold 94 is assembled by placing cavity ring 98 between block 96 and stamper 100. Upon assembly of mold 94, substrate material is injected into the mold to form dummy substrate 56. Dummy substrate 56 is then removed from mold 94 to be assembled with data substrate 52 according to the construction of optical disk 50 described in FIG. 5A. By creating dummy substrate 56 with stamper 100, a surface for accepting a print material is created without the need for an additional layer or coating on the outer surface of dummy substrate 56.

FIG. 6B shows mold 104 for creating substrate 66 of optical disk 62. Mold 104 includes stamper 106, cavity ring 108, stamper 110, and substrate 66. Stamper 106 creates the data surface of substrate 66 with inverse data surface 112. Stamper 110 creates the microstructured surface of substrate 66 with inverse microstructured surface 114. Through the use of stampers 106 and 110, substrate 66 may accept a print material without requiring an additional layer or coating to accept the print material of a label.

FIG. 6C shows mold 116 that may be used to create data substrate 74 of optical disk 72. Mold 116 includes mirror block 118, cavity ring 120, stamper 122, and data substrate 74. Stamper 122 includes inverse data surface 124 which creates the data surface of data substrate 74. Block 118 provides a smooth surface that allows a laser to interrogate the data surface of data substrate 74. In some examples, block 118 may also be considered a stamper. Data substrate 74 does not contain the microstructured surface of optical disk 72, as an additional layer is later applied to data substrate 74 in order to create the microstructured surface of optical disk 72, as shown in FIG. 7.

Figure 7:
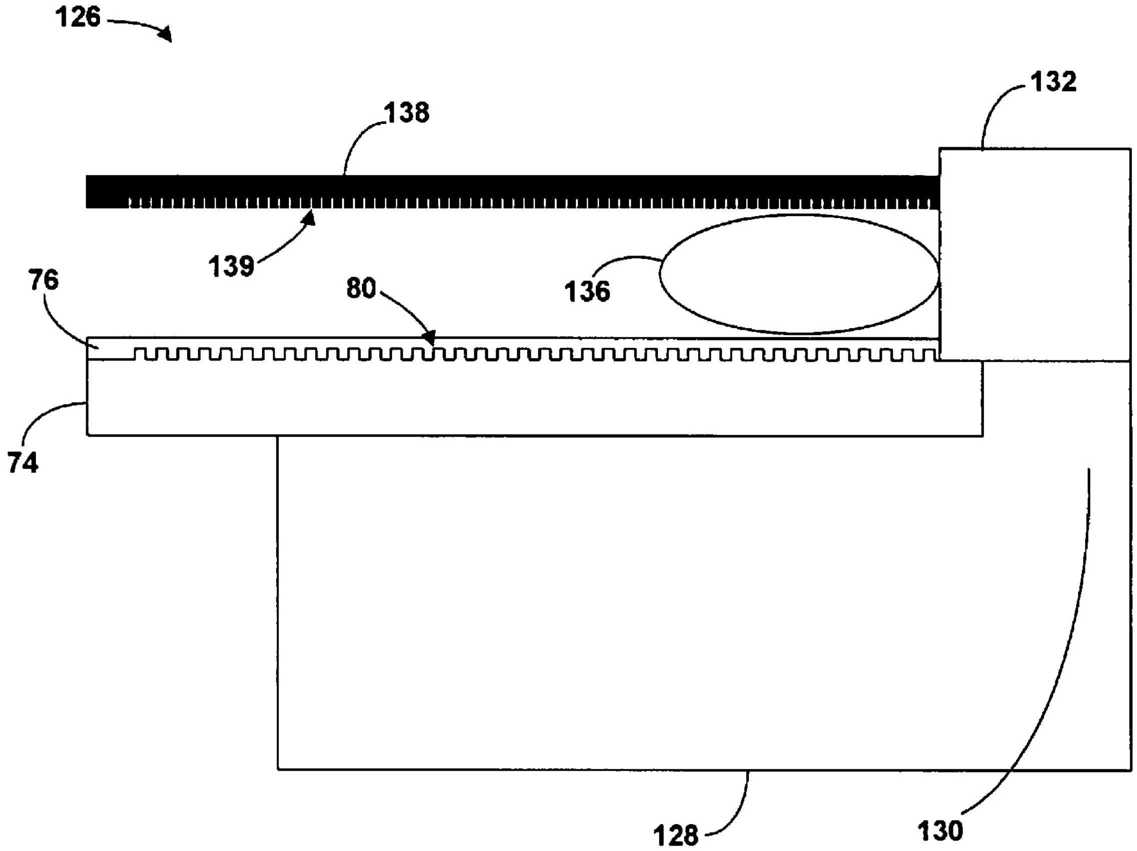
FIG. 7 is a cross-sectional view of a spin-replication device for creating a microstructured surface on a surface of an optical disk.

FIG. 7 is a cross-sectional view of an assembly 126 for creating a microstructured surface of an optical disk. FIG. 7 provides an example technique for creating a microstructured surface of an optical disk. Other techniques for sealing layer bonding, spin-bonding, mold tooling, or creating a microstructured surface of an optical disk may also be used in alternative examples. As shown in FIG. 7, data substrate 74 contains data surface 80 that is readable by a laser. Assembly 126 is used to replicate the microstructured surface of optical disk 72 and includes disk vacuum chuck 128 and first spindle 130. Second spindle 132 seals data substrate 74 from disk vacuum chuck 128. Data substrate 74 includes data surface 80 and thin films 76, in which thin films 76 may have been produced with disk assembly 126. Sealing layer material 136 is applied to data substrate 74 below stamper 138. Stamper 138 includes inverse microstructured surface 139 that creates the microstructured surface of optical disk 72 in sealing layer material 136. Stamper 138 allows the sealing layer material 136 to be cured to produce sealing layer 78 with microstructured surface 82. In some examples, stamper 138 is flexible to facilitate removal from sealing layer 78.

Data substrate 74 defines data surface 80 and thin films 76 which substantially covers the data surface. Thin films 76 allow data surface 80 to be covered in a reflective surface that is needed in order for the data to be read by a laser. In some examples, sealing layer material 136 may be used to cover data surface 80 directly and create the microstructured surface in the sealing layer material formed by stamper 138. Disk assembly 126 may be used to create a variety of layers upon data substrate 74, based upon the desires of a user. In any event, sealing layer material 136 may be used to create a microstructured surface of a completed optical disk 72.

Data substrate 74 is center-registered to first spindle 130. First spindle 130 has a diameter smaller than second spindle 132, with exact dimensions that vary based upon the configuration of optical disk 72. For example, first spindle 130 may have a diameter of 15 mm while second spindle 132 may have a diameter of 50 mm. Second spindle 132 is set down over first spindle 130 to secure data substrate 74. Second spindle 132 acts as a seal between disk-shaped replica data substrate 74 and disk vacuum chuck 128 and the center-registration point for stamper 138. While the diameters of first spindle 130 and second spindle 132 do not have to be as described above, second spindle 132 should be the same diameter as a centering pin used to center stamper 138. Stamper 138 contacts sealing layer material 136 when placed on second spindle 132. Stamper 138 may be greater than or equal to 120 mm in outer diameter with a hole in the center with a diameter equal to thin films 76. The size of stamper 138 may be different in some embodiments, as long as the stamper completely covers thin films 76 of data substrate 74.

Sealing layer material 136 is used to create sealing layer 78 with a microstructured surface corresponding to inverse microstructured surface 139 of stamper 138, where sealing layer material 136 may be created to a desired thickness. Sealing layer material 136 may comprise any material, such as a resin, that can be moldable in one stage to form to adhere to the adjacent substrates and can be cured afterwards to form the desired surface of optical disk 72. Sealing layer material 136 has a viscosity that allows the final curable material to flow over the surface of thin films 76 when forced towards the outer edge of data substrate 74. Sealing layer material 136 may have a viscosity that is determined by the manufacturer to be ideal for the creation of optical disk 72.

Vacuum chuck 128 spins at a high angular speed to force sealing layer material 136 away from second spindle 132. Angular speeds may be between 4000 and 8000 revolutions per minute (rpm), and more ideally at approximately 6000 rpm. As sealing layer material 136 flows outward, thin films 76 of data substrate 74 adhere to the outwardly flowing sealing layer material. Spinning may be performed until sealing layer material 136 defines a desired thickness. In this embodiment, sealing layer material 136 is spun until it is between approximately 5 μm and approximately 15 μm thick. In other embodiments, the thickness of sealing layer material 136 may be more or less than this thickness. While the thickness of sealing layer material 136 may slightly vary radially with respect to data substrate 74, thickness may be consistent in the circumferential direction. For example, the circumferential thickness variation in one rotation may be less than 2 μm.

Sealing layer material 136 is also curable to form a stable microstructured surface that can receive a print material. Curing may be done by numerous methods, but this embodiment describes the use of ultraviolet (UV) light to cure sealing layer material 136 into a hard material, such as sealing layer 78 of optical disk 72. A UV light source directs UV light through stamper 138 to harden and cure sealing layer material 136. In this manner, stamper 138 may allow the transmission of UV energy to sealing layer material 136. Once sealing layer material 136 has cured, stamper 138 may be removed such that optical disk 72 is complete and can be removed from first spindle 130. In some examples, sealing layer material 136 may be cured through other means, such as heat, cold, electrical current, exothermic curing, or any other commonly used method for curing a layer of an optical disk.

Figure 8:
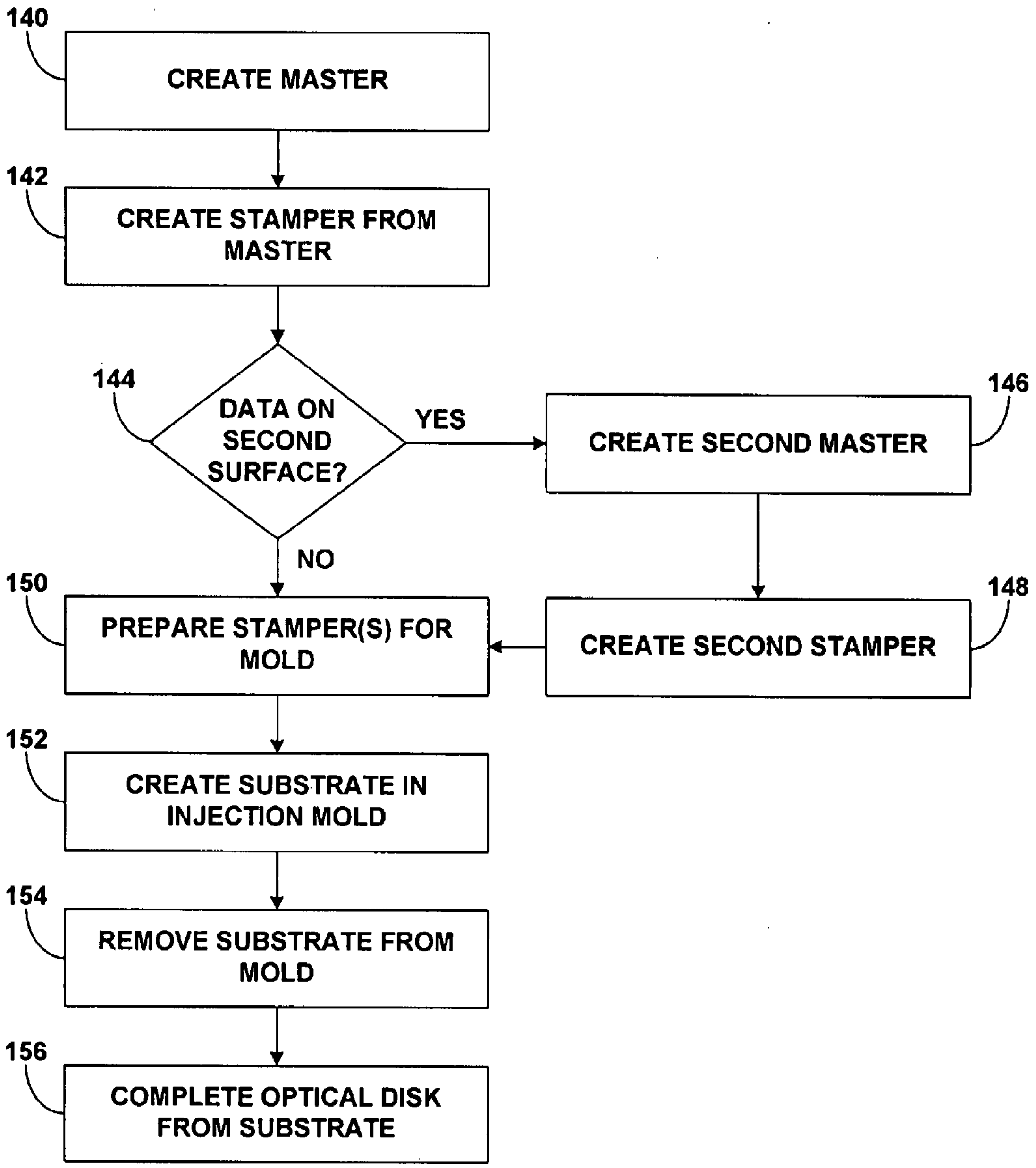
FIG. 8 is a flow diagram illustrating an example method for creating an optical disk with a substrate having a microstructured surface.

FIG. 8 is a flow diagram illustrating an exemplary method for creating an optical disk with a substrate having a microstructured surface. Optical disk 62 will be used as an example, but substrates for optical disks 50 and 72 may also be formed with this method. As shown in FIG. 8, the creation of optical disk 62 begins with a user creating a master stamper that represents microstructured surface 70 of the optical disk (140). The user then uses the master stamper to form a mold that is a stamper having an inverse microstructured surface (142). If a data surface also needs to be formed in the second surface of the substrate (144), the user creates a second master stamper (146). The user makes a mold of the second master stamper to create a second stamper having an inverse data surface (148). If there is no data surface on the second surface of the substrate, such as in optical disk 50, the second master stamper is not needed and the user proceeds to step 150. The creation of substrates using stampers derived from master stampers is referred to as 2P replication. Alternatively, other methods for forming a data surface or microstructured surface in a substrate may also be employed.

Once both stampers are created, the user prepares both stampers in a mold 104 (150). The user injects the substrate material into mold 104 that creates substrate 66 having data surface 68 and microstructured surface 70 on opposing sides of the substrate (152). After substrate 66 is cured, the substrate is removed from mold 104 (154). The user may then complete optical disk 62 by adding any number of layers needed for the use of the optical disk (156). For example, the user may add thin film 64 to cover data surface 68.

Figure 9:
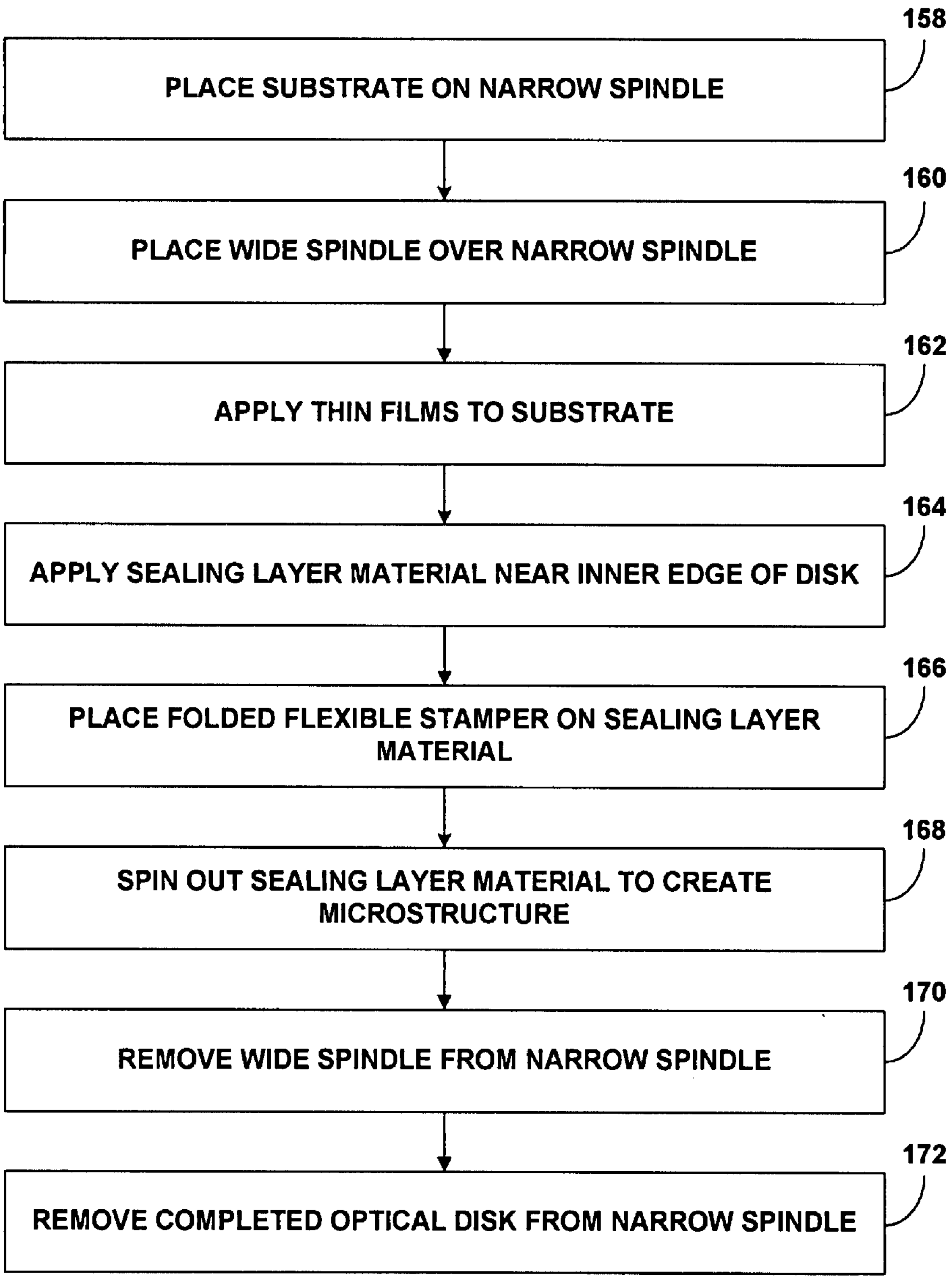
FIG. 9 is a flow diagram illustrating an example method for creating an optical disk with a spin-replicated microstructured surface.

FIG. 9 is a flow diagram illustrating an example method for creating an optical disk with a spin-replicated microstructured surface. Other methods of creating a microstructured surface may be used in alternative examples. As shown in FIG. 9, optical disk 72 is finalized after data substrate 74 is first produced using the method of FIG. 8. A user is described as performing the steps of FIG. 9, but the steps may be automated by a spin-replication device. The user first places data substrate 74, e.g., a molded disk, onto narrow spindle 130 (158). The user then places wide spindle 132 over narrow spindle 130 in order to hold data substrate 74 in place (160). Once data substrate 74 is in place, the user applies thin films 76 to data substrate 74 (162).

The user may complete optical disk 72 through the creation of microstructured surface 82 in sealing layer 78. The user applies sealing layer material 136 near the inner layer of data substrate 74 (164). The user then places stamper 138 on sealing layer material 136 (166) and spins vacuum chuck 128 to spin out or flow sealing layer material 136 between thin films 76 and stamper 138 (168). Once sealing layer material 136 is cured with UV light through stamper 138, the user may remove wide spindle 132 from narrow spindle 130 (170). The user then can remove the completed optical disk 72 from narrow spindle 70 ready for a label to be added to microstructured surface 82 (172).

The method of FIG. 9 may be used in any application where a thin film, sealing layer, or other coating is applied to an optical disk. After sealing layer 78 is cured, a stiff stamper may be able to be lifted off of microstructured surface 82 in some examples. In alternative examples, stamper 138 may be used to create microstructured surface 82 without spin replication. Stamper 138 may be applied to a sealing layer material using a roll-on embossing method in which the stamper rolls across a malleable surface to create microstructured surface 82. Other methods may also be used to create microstructured surface 82 in a layer or material of an optical disk.

Figure 10:
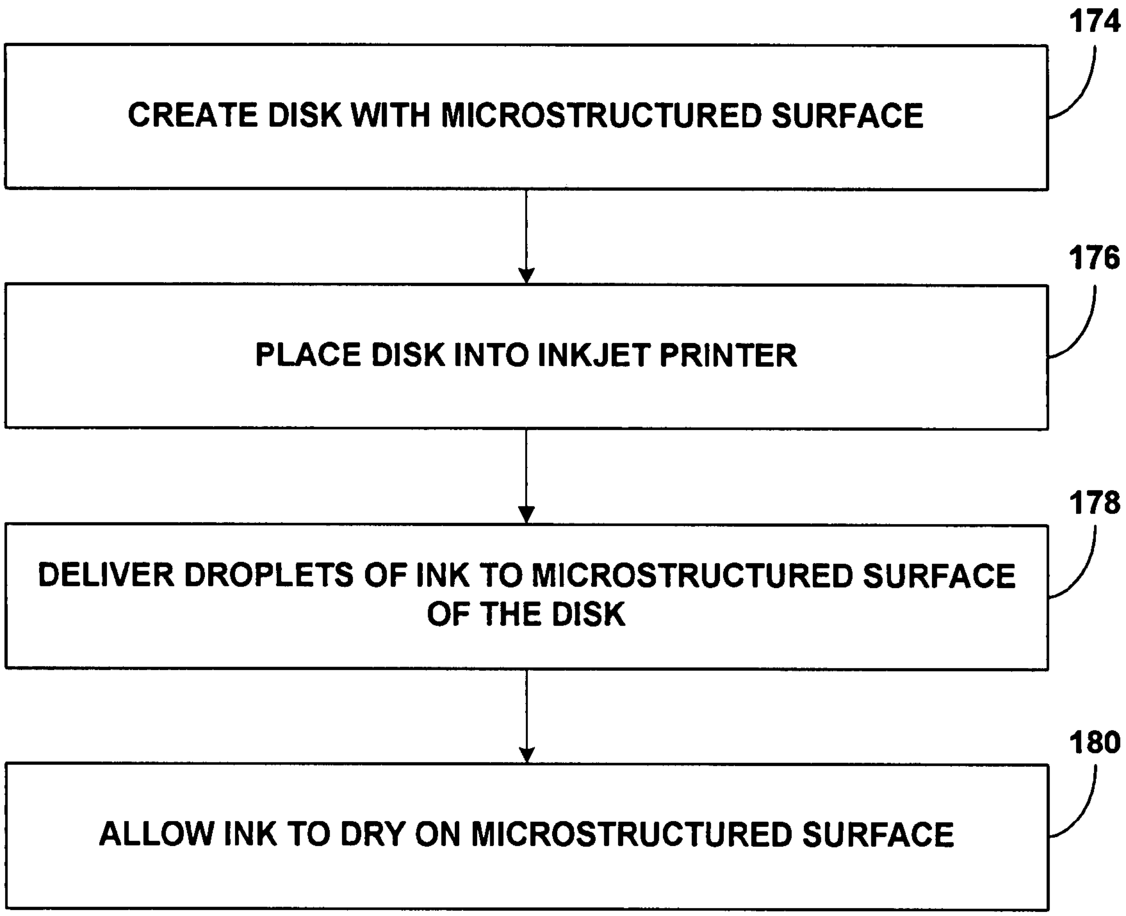
FIG. 10 is a flow diagram illustrating an example method for applying ink to the microstructured surface on an optical disk.

FIG. 10 is a flow diagram illustrating an example method for applying ink to the microstructured surface on an optical disk. As shown in FIG. 10, a user may first create any of optical disks 50, 62 or 72 that have a microstructured surface that is designed to promote the adhesion of ink from an inkjet printer (174). Optical disk 50 will be described herein as an example. However, in other examples, the user may purchase the optical disk with the microstructured surface from a manufacturer or distributor. In this case, the method may eliminate step 174. The user places optical disk 50 into the inkjet printer according to the specifications of the inkjet printer manufacturer (176). The inkjet printer delivers or applies ink droplets of ink, e.g., a print material, to microstructured surface 60 to create the label identifying the content of optical disk 50 (178). The user then allows the ink to dry on the microstructured surface of optical disk 50 (180). According to the microstructured surface defined herein, the microstructured surface may contain wells, raised features, or any other structure that accepts ink and prevents the ink from migrating across the surface of optical disk 50. A benefit of the microstructured surface is that the user may be able to more quickly move or stack optical disk 50 before the ink has dried. Therefore, the user may be able to print user printed labels on optical disks at a faster rate than without a microstructured surface because the user may not need to caution against ink migration which could affect the quality of the label.

Figure 11:
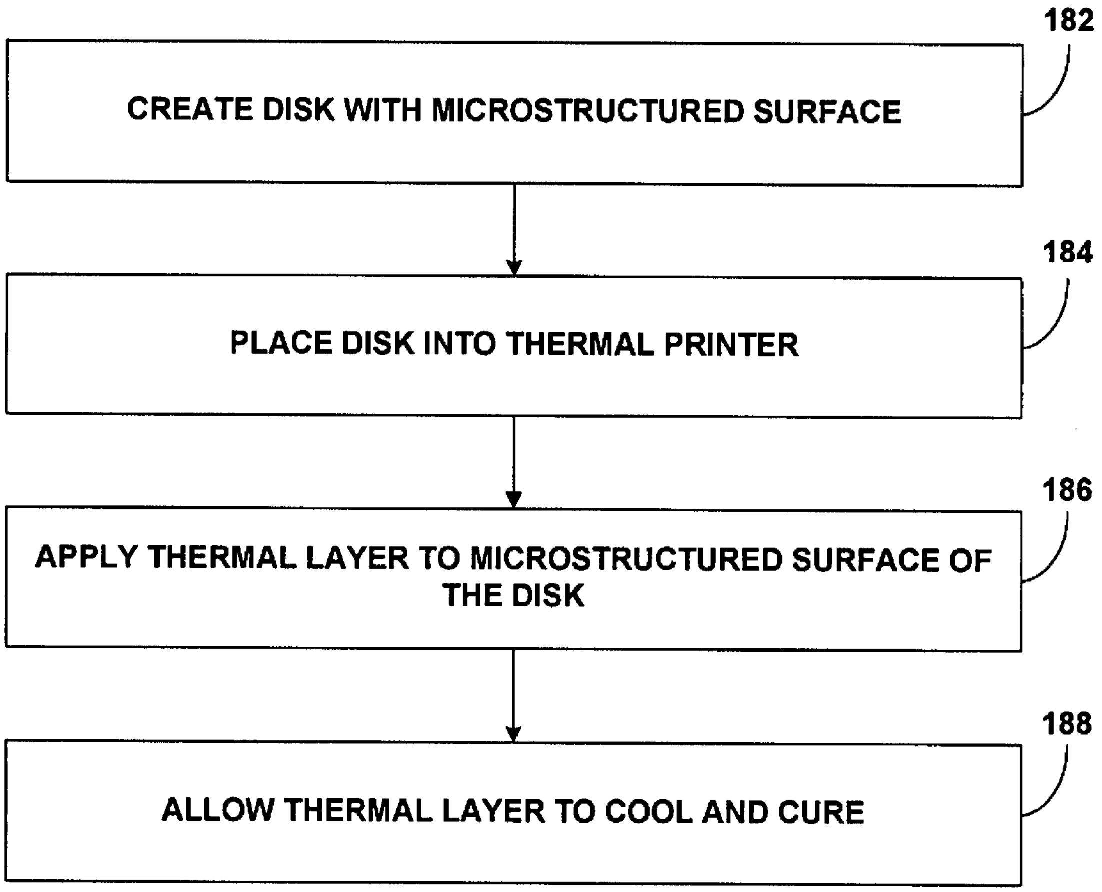
FIG. 11 is a flow diagram illustrating an example method for applying a thermal layer to the microstructured surface on an optical disk.

FIG. 11 is a flow diagram illustrating an example method for applying a thermal layer to the microstructured surface on an optical disk. As shown in FIG. 11, a user may first create any of optical disks 50, 62 or 72 that have a microstructured surface that is designed to promote the adhesion of a thermal layer from a thermal printer (182). Optical disk 50 will be described herein as an example. The user places optical disk 50 into the thermal printer according to the specifications of the thermal printer manufacturer (184). The thermal printer heats and applies the thermal layer to microstructured surface 60 in order to bond the thermal layer to the microstructured surface and create the label identifying the content of optical disk 50 (186). The user then allows the thermal layer to cool and cure on the microstructured surface of optical disk 50 (188). According to the microstructured surface defined herein, the microstructured surface may contain wells, raised features, or any other structure that promotes the adhesion of the thermal layer and prevents the migration of the thermal layer across the surface of optical disk 50. A benefit of the microstructured surface is that the user may be able to more quickly move or tilt optical disk 50 before the thermal layer has completely cured. Therefore, the user may be able to print user printed labels on optical disks at a faster rate than without a microstructured surface because the user may not need to caution against ink migration which could affect the quality of the label or lead to optical disks that need to be discarded.

Figure 12A:
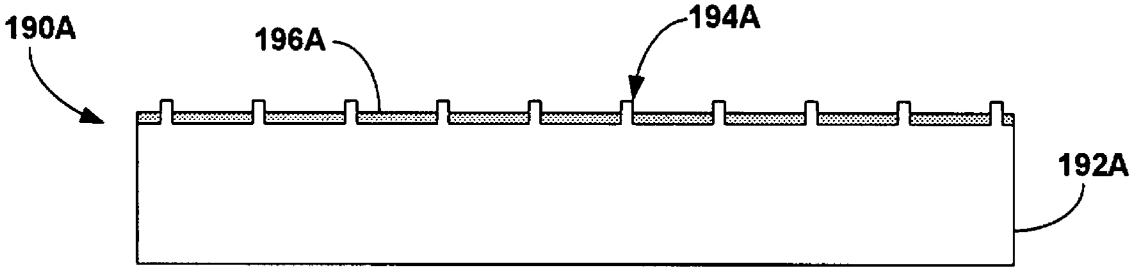
FIGS. 12A and 12B are cross-sectional views of example optical disks with a plurality of standoff features formed in an outer surface of the optical disk.
Figure 12B:
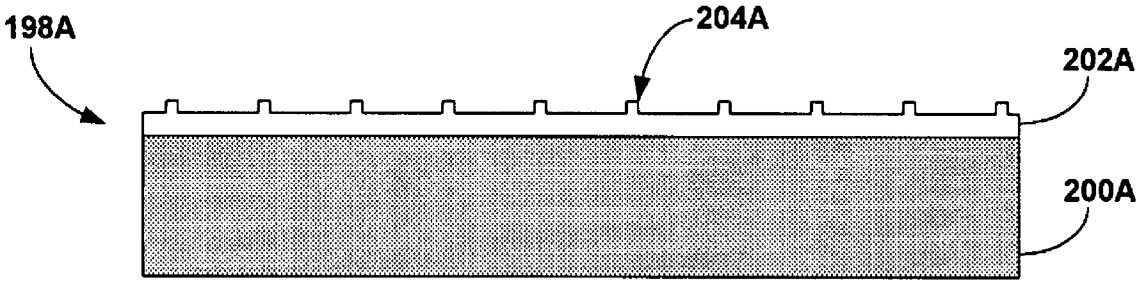

FIGS. 12A and 12B are cross-sectional views of example optical disks with a plurality of standoff features. A microstructured surface may be created on a surface of an optical disk for purposes other than to print a label to the disk. Standoff features may be formed in the optical disk to protect against scratches to the surface of the optical disk. In other words, an outer surface of the optical disk may comprise a set of protruding anti-scratch elements, e.g., standoff features that protect the underlying outer surface of the disk. As shown in FIG. 12A, layers 1 90A includes disk-shaped substrate 192A and print material receptive layer 196A. Standoff features 194A are formed into substrate 192A via the use of a stamper with an inverse standoff surface, and print material receptive layer 196A is applied to substrate 192A to accept a print material from an optical disk printer. Standoff features 194A are staggered across the surface of substrate 192A such that the standoff features do not distract from the label created by the print material.

Layers 190A may be a portion of a complete optical disk. A data surface may be formed within a surface of substrate 192A or within an additional layer or substrate attached to layers 190A. However, a laser is not directed through substrate 192A in order to interrogate the data surface of the optical disk. Layers 190A may be used in such optical disks similar to optical disk 50, 62 or 72. In some examples, a microstructured surface configured to receive a print material as described herein may be formed among standoff features 194A in place of print material receptive layer 196A.

Substrate 192A may be created using a mold, similar to the molds described in FIGS. 6A-6C. A stamper with an inverse standoff surface may be used to form standoff features 194A in substrate 192A. Substrate 192A may then be used as a portion of an optical disk. In some examples, substrate 192A may be formed using an additional stamper to form the data surface in substrate 192A opposing standoff features 194A. The data surface of substrate 192A may be later covered in thin films and/or a sealing layer.

FIG. 12B shows layers 198A which includes disk-shaped substrate 200A and sealing layer 202A. Sealing layer 202A includes standoff features 204A that prevent scratches or other damage to sealing layer 202A that may alter the appearance of a label printed on the surface of layers 198A. Similar to layers 190A, layers 198A may be a part of a complete optical disk containing a data surface or data layer in which the laser that interrogates the data surface does not penetrate sealing layer 202A. The label may be printed to substrate 200A before sealing layer 202A is added to the substrate. In additional examples, a microstructured surface may be formed between standoff features 204A in sealing layer 202A to include wells, raised features, or other structures to accept a print material.

Sealing layer 202A may be created through the use of a photopolymer replication process. In other examples, sealing layer 202A may be created with spin-replication where a sealing layer material is spun out between substrate 200A and a stamper which may be flexible. Alternatively, sealing layer 202A may be formed by roll embossing standoff features 204A with a stamper that is rolled over the sealing layer before it cures. In any case, standoff features are formed to prevent scratches from occurring when the optical disk is laid on a substantially flat surface.

Figure 12C:
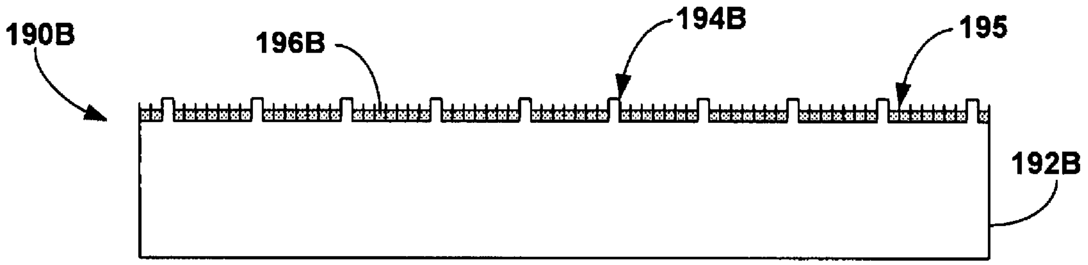
FIGS. 12C and 12D are cross-sectional views of example optical disks with a plurality of standoff features and wells formed in an outer surface of the optical disk.
Figure 12D:
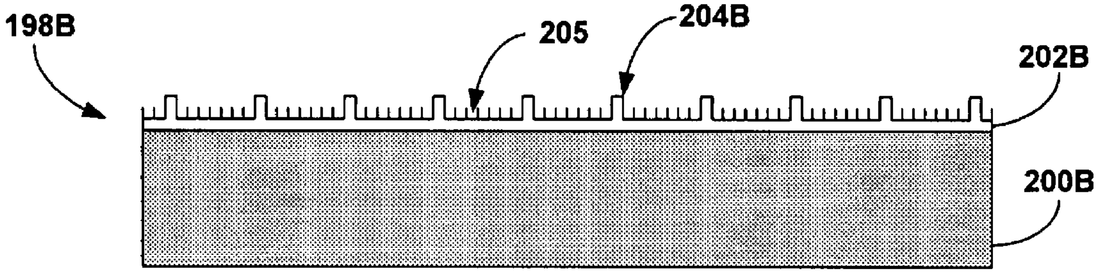

FIGS. 12C and 12D are cross-sectional views of example optical disks with a plurality of standoff features and wells formed in an outer surface of the optical disk. As shown in FIG. 12C, layers 190B is similar to layers 190A of FIG. 12A; however, layers 190B includes wells 195 in addition to standoff features 194B. Layers 190B also includes disk-shaped substrate 192B and print material receptive layer 196B. Standoff features 194B and wells 195 are formed into substrate 192B via the use of a stamper with an inverse standoff surface. Print material receptive layer 196B is applied to wells 196B of substrate 192B to accept a print material from an optical disk printer. Standoff features 194B are staggered across the surface of substrate 192B such that the standoff features do not distract from the label created by the print material.

Wells 195 may be part of the microstructured surface of substrate 192B and may prevent print material receptive layer 196B from migrating laterally across the surface of substrate 192B. In addition, wells 195 may prevent lateral migration of the print material when it is applied to print material receptive layer. In other examples, wells 195 may not extend beyond print material receptive layer 196B and the print material may need to cure to the print material receptive layer in order for migration to be reduced.

FIG. 12D shows layers 198B, which is similar to layers 198A of FIG. 12B. Layers 198B includes disk-shaped substrate 200B and sealing layer 202B. Sealing layer 202B includes standoff features 204B that prevent scratches or other damage to sealing layer 202B that may alter the appearance of a label printed on the surface of layers 198B. In addition, sealing layer 202B includes wells 205 within a microstructured surface of sealing layer 202B. Wells 205 may be configured to accept a print material receptive layer and/or a print material that creates the label of the optical disk. In this manner, sealing layer 202B may be formed to include both standoff features 204B and a microstructured surface including wells 205.

Figure 13A:
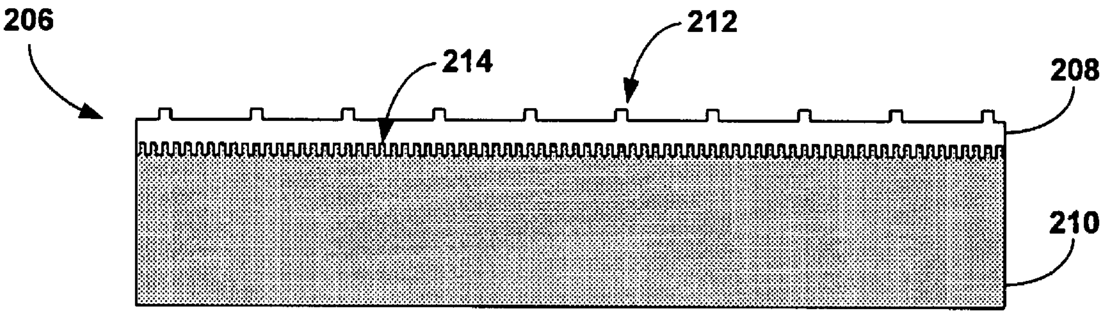
FIGS. 13A and 13B are cross-sectional views of example optical disks having standoff features on the outer surface of the optical disk over a data surface of the disk.
Figure 13B:
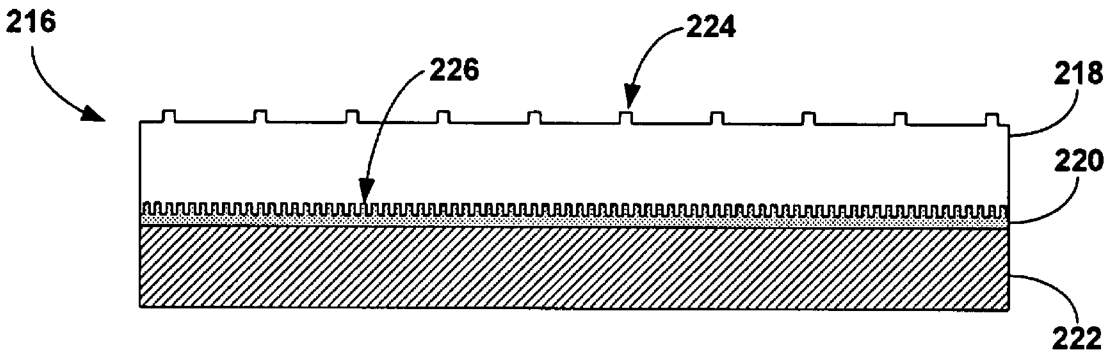

FIGS. 13A and 13B are cross-sectional views of example optical disks with a plurality of standoff features on the outer surface used to interrogate the data surface of the optical disk. As shown in FIG. 13A, layers 206 may be a portion of an optical disk that includes one or more layers. Layers 206 includes substrate 210 and cover layer 208. A laser interrogating data surface 214 must be directed through cover layer 208. Therefore, scratches in the surface of cover layer 208 may diffract light from the laser and cause errors in the retrieval of data from data surface 214. Cover layer 208 includes standoff features 212 which limit scratches created in the cover layer by preventing the cover layer surface from contacting another surface.

As described previously, data surface 214 is formed in substrate 210 through an injection molding process. Cover layer 208 may be formed over data surface 214 of substrate 210 through a spin-replication or roll embossing method. In some examples, one or more thin films may be applied to data surface 214 in order to attach a pre-formed or molded cover layer 208 to the thin films. In any case, the surface of cover layer 208 must be optically transparent to a laser while standoff features 212 do not substantially interfere with the interrogation. In addition, standoff features 212 may be positioned in relation to data surface 214 such that the standoff features have a minimal impact on the diffraction of light from cover layer 208. Layers 206 is illustrated in FIG. 13A as an example only. Dimensions of standoff features 212, data surface 214, substrate 210 and cover layer 208 may vary depending upon the desires of the manufacturer or user.

FIG. 13B shows layers 216 which is a portion of an optical disk or the complete optical disk that stores digital data. Layers 216 includes data substrate 218, thin film 220, and dummy substrate 222. Substrate 218 includes standoff features 224 formed on the outer surface of the substrate and data surface 226 formed on the inner surface of the substrate. Standoff features are positioned to prevent the majority of data substrate 218 from coming into contact with another surface. In this manner, standoff features 224 may prevent scratches from being created in data substrate 218. In some examples, standoff features 224 may be positioned strategically in relation to data surface 226 to prevent undesired light diffraction caused by the standoff features.

In either of layers 206 or 216, standoff features are designed to minimize any disturbance of the laser interaction with the data surface. The laser configured to interrogate the data surface of an optical disk is focused to the depth of the data surface. The major portion of the focused cone of light passes by the standoff features and is not affected by sparsely positioned standoff features and comes to focus on the data surface. Conversely, that small portion of the focused cone of light that coincides with the standoff features may be deviated from optimal focus spot on the data surface. Thus, optical losses to the focused spot are minimized by spacing small standoff features sparsely across the surface of the optical disk. The disturbance to the focal cone of laser light depends on the fraction of that cone angle which is subtended by the standoff features. Increasing the size or quantity of standoff features within the field of view of the focused cone of light may add to the deterioration of the focused optical spot.

The optical disk may be manufactured according to a format that includes specifications for designed record and readout optical systems. In particular, the numerical aperture (NA) of the objective lens is specified for the format of a particular optical disk. For example, the numerical aperture 0.47 of the CD format provides for a relatively low density recording density, relatively long focal length, and a defocusing layer thickness of 1.2 mm. As another example, the BluRay format requires an NA of 0.85 to provide for high density recording that decreases lens focal length when compared to the CD format. Additionally, the BluRay format includes a small 100 micron defocusing layer thickness. The optical disk formats specifying objective lenses with shorter focal lengths or thinner defocusing layers of the optical disk may require fewer standoff features and/or standoff features with less surface area than optical disks with longer focal lengths and thicker defocusing layers.

In alternative examples, an optical disk may contain standoff features on both sides of the optical disk. In other words, standoff features may protect the optical disk from scratches to the label or printed surface and/or the transparent surface a laser penetrates for interrogating the data surface. However, the standoff features present on both sides of the optical disk may be different from each other. For example, the standoff features on the label side of the optical disk may have a greater height to extend beyond the applied print material while the data side of the optical disk may have shorter standoff features to reduce the interference of the standoff features with a laser. In other examples, standoff features on one side of an optical disk may cover a greater surface area of the optical disk than the standoff features of the other side of the optical disk.

Figure 14:
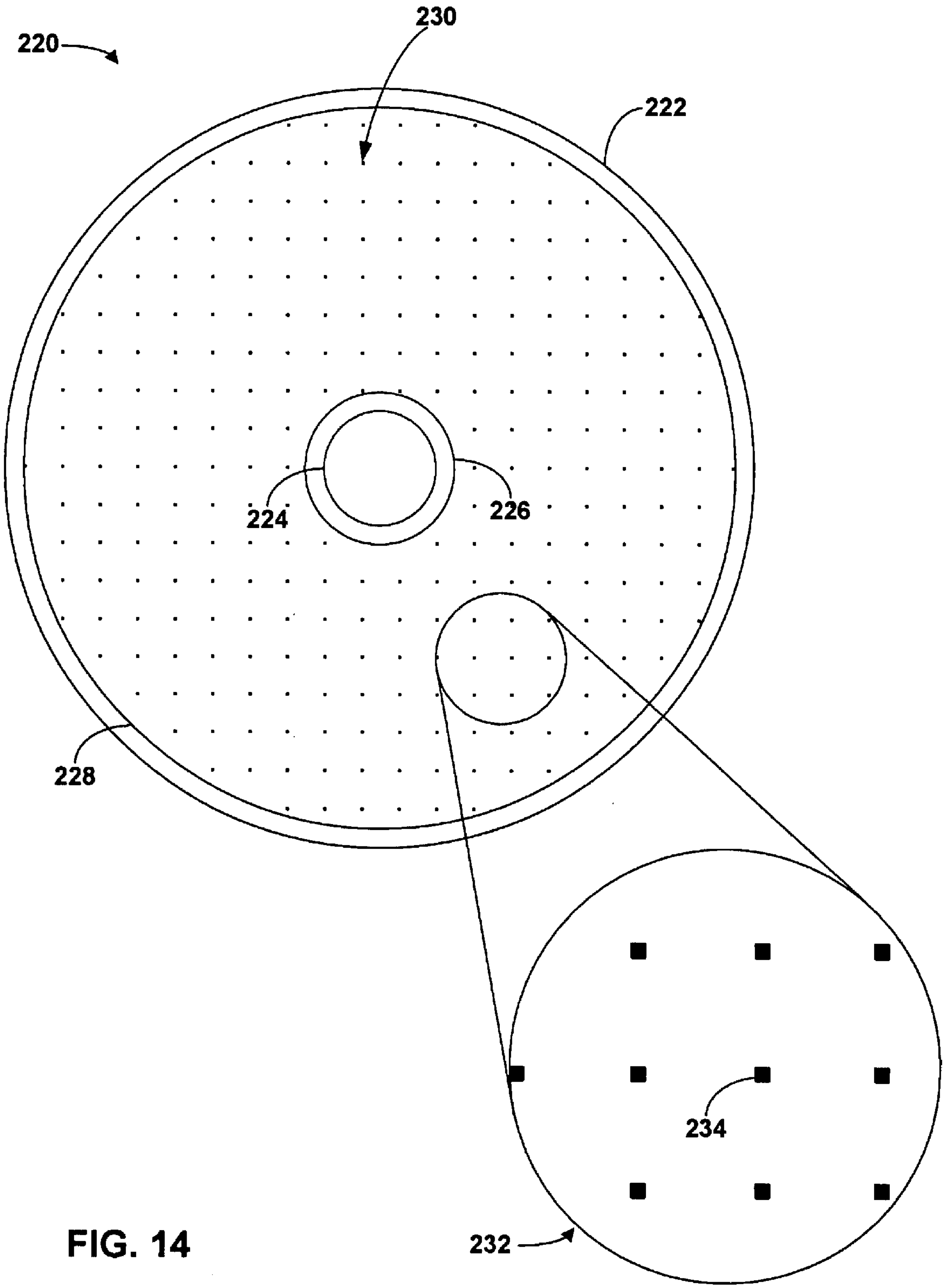
FIG. 14 is a magnified top view of an outer surface of the optical disk having standoff features.
Figure 15:
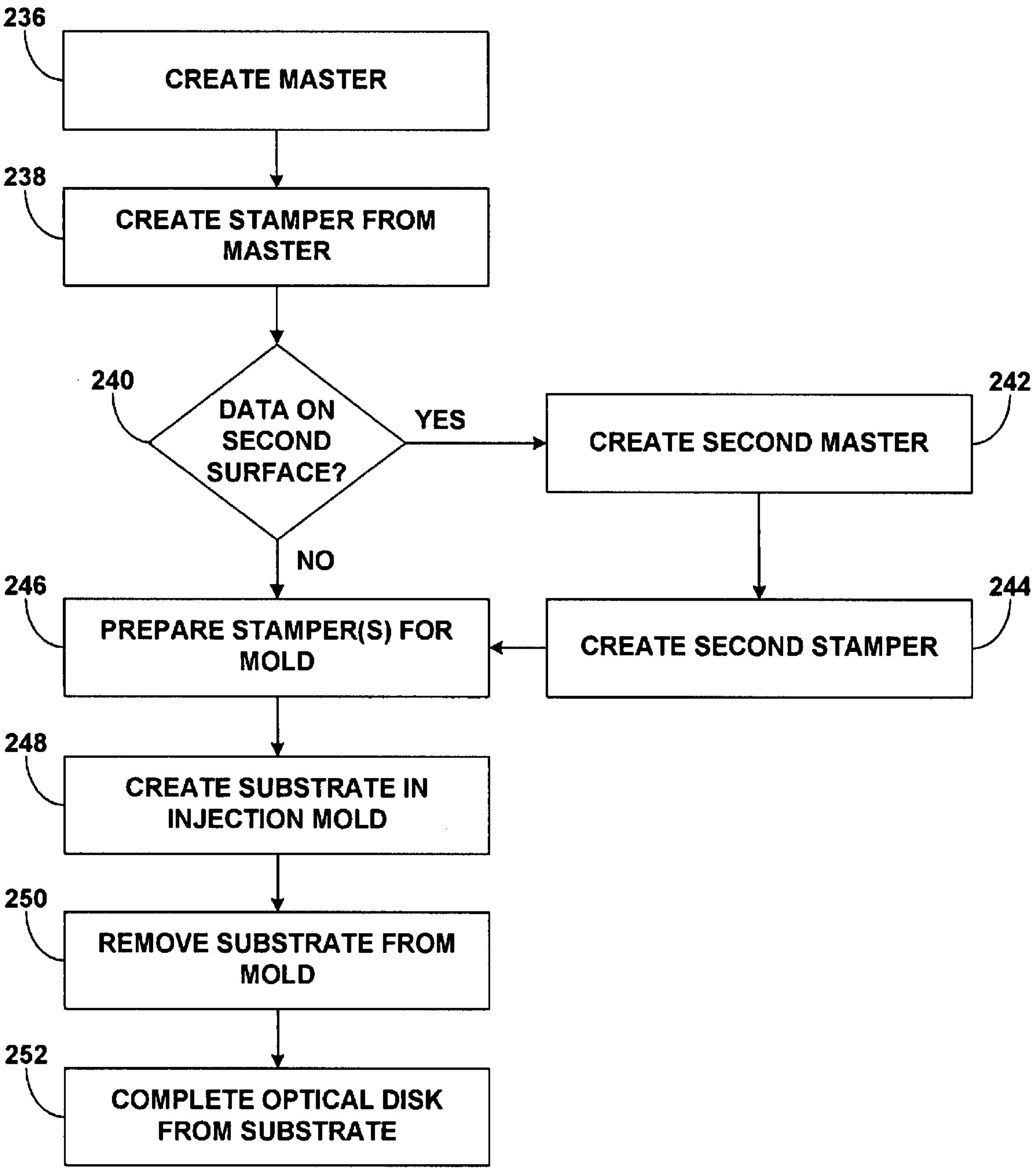
FIG. 15 is a flow diagram illustrating an example method for creating an optical disk with a substrate having a plurality of standoff features.

FIG. 14 is a magnified top view of a plurality of standoff features on a surface of an optical disk. As shown in FIG. 15, optical disk 220 may incorporate any of disks 190A, 190B, 198A, 198B, 206, and 216. Optical disk 220 has inner diameter 224 and outer diameter 222. Standoff surface 230 is located between inner radius 226 and outer radius 228, the same area of optical disk 220 in which the data surface of the optical disk is located. Subsection 232 provides a magnified view of standoff surface 230 and individual standoff features 234.

Standoff features 234 are spread out over standoff surface 230 between inner radius 226 and outer radius 228. In some examples, standoff surface 230 may also extend to inner radius 224 and/or outer radius 222. Since standoff features 234 are provided to prevent contact between the surface of optical disk 220 and another substantially flat surface, the standoff features are spaced to evenly support the surface or the disk without interfering with the label or laser interrogation of the data surface. Standoff features 234 of standoff surface 230 may reduce the possibility of loose particles between an adjacent surface or uneven structures of the adjacent surface to cause scratches or other imperfections in the surface of optical disk 220 between the standoff features.

Generally, standoff features 234 may protrude only slightly from the base surface of standoff surface 230. The height of standoff features 234 may be between 0.1 μm and 20 μm. More specifically, the height of standoff features 234 may be between 1 μm and 10 μm. In any case, the height of standoff features 234 may be configured to create enough space between the surface of optical disk 220 and an adjacent in order to prevent the creation of scratches in the outer surface of the optical disk. In any case, standoff features 234 may be smaller than the designed working distance between the objective lens of the corresponding recording and readout optical system and standoff surface 230.

Standoff features 234 may only take up a certain percentage of the total area between inner radius 226 and outer radius 228. Generally, standoff features 234 may cover between approximately 0.01 percent and approximately 10 percent of the total surface area between inner radius 226 and outer radius 228. Specifically, standoff features 234 may cover between approximately 0.1 and approximately 1 percent of the total surface area between inner radius 226 and outer radius 228. In any case, standoff features must be minimally noticeable within a label or unobtrusive to laser interrogation of the data surface.

In alternative examples, the number of standoff features 234 may depend upon the entrance beam diameter of the laser when the standoff features are covering the data surface. The entrance beam diameter is the diameter of the laser as it passes the outer surface of optical disk 220. Generally, the surface area covered by standoff features 234 may be between approximately 0.01 percent and approximately 10 percent of the entrance beam area. More specifically, the surface area covered by standoff features 234 may be between approximately 0.1 and approximately 1 percent of the entrance beam area. The entrance beam diameter, or area, is determined by the type of format used in optical disk 220. In the examples below, standoff feature 234 areas is determined as 1 percent of the entrance beam area, and the standoff features are described as square shaped posts.

An example CD has a defocusing thickness of 1.2 millimeters (mm) and a numerical aperture (NA) of 0.47 to create an entrance beam diameter of approximately 1.28 mm. Therefore, the maximum standoff feature surface area is 12,868 $\mu m^2$ within the entrance beam area. This maximum area corresponds to a maximum of 32 standoff features 234 having a width of 20 μm, 128 standoff features having a width of 10 μm, and 515 standoff features having a width of 5 μm.

An example DVD has a defocusing thickness of 0.6 mm and a NA of 0.65 to create an entrance beam diameter of approximately 1.02 mm. Therefore, the maximum standoff feature surface area is 8,171 $\mu m^2$ within the entrance beam area. This maximum area corresponds to a maximum of 20 standoff features 234 having a width of 20 μm, 82 standoff features having a width of 10 μm, and 326 standoff features having a width of 5 μm.

An example BluRay disk has a defocusing thickness of 0.1 mm and a NA of 0.85 to create an entrance beam diameter of approximately 0.32 mm. Therefore, the maximum standoff feature surface area is 804 $\mu m^2$ within the entrance beam area. This maximum area corresponds to a maximum of 2 standoff features 234 having a width of 20 μm, 8 standoff features having a width of 10 μm, and 32 standoff features having a width of 5 μm.

The number of standoff features 234 that could be within the entrance beam area of the laser may also be dependent upon the shape and height of the standoff features, as the standoff features do not necessarily need to be square posts. For example, standoff features 234 may be rectangular, circular (or cylindrical), hexagonal, or any other shape with vertical walls perpendicular with the surface of optical disk 220. In other examples, standoff features 234 may have angled or sloped walls with respect to the surface of optical disk 220, such that the base of each standoff feature is larger than the tip of the standoff feature. Example standoff features 234 may include cones, pyramids, domes, or other such shapes. Similarly, the top of standoff features 234 may not be flat or parallel with the outer surface of optical disk 220. The top of each standoff feature 234 may be domed, pointed, cupped, or shaped in such a manner to limit diffraction of light and interference with the interrogating laser. Alternatively, standoff surface 230 may include varying shapes and/or sizes of standoff features 234 across the area of the standoff surface. For example, the width of standoff features 234 closer to inner radius 226 may be smaller than the width of the standoff features closer to outer radius 228.

In addition to variations between standoff features 234, the placement of the standoff features may vary across the surface of standoff surface 230. In other words, the pattern of standoff features 234 in standoff surface 230 may vary from the example of FIG. 14. FIG. 14 shows standoff features 230 in a square grid-like pattern. However, standoff features 234 may be arranged in a staggered row pattern where every other row of standoff features 234 may be shifted in the same direction. Alternatively, the number of standoff features 234 may increase radially from inner radius 226 to outer radius 228. In this manner, the laser may encounter the same number of standoff features 234 at any given location on optical disk 220. In any case, the density of standoff features 234 in any standoff surface pattern may not exceed the density that the laser can ignore when interrogating the data surface.

FIG. 15 is a flow diagram illustrating an example method for creating an optical disk with a substrate having a microstructured surface with standoff features. Layers 216 will be used as an example, but substrates for layers 190A, 190B, 198A, 198B, or 206 or optical disk 220 may also be formed with this method. While an example injection molding technique is described, other molding or mold tooling techniques may be used to create substrates for layers 190A, 190B, 198A, 198B, 206, 216, or optical disk 220. The method of FIG. 15 is performed by a replication system. However, other examples may utilize multiple devices, systems, or users at one or more facilities to complete the steps of FIG. 15. As shown in FIG. 15, the creation of layers 216 begins with the replication system creating a master stamper that represents standoff features 224 of the standoff surface (236). The replication system then uses the master stamper to form a mold that is a stamper having an inverse standoff surface (238). If a data surface 226 also needs to be formed in the second surface of the substrate (240), the system creates a second master stamper (242). The system then creates a mold of the second master stamper to create a second stamper having an inverse data surface (244). If there is no data surface on the second surface of the substrate, the second master stamper is not needed and the system proceeds to step 246. The creation of substrates using stampers derived from master stampers is referred to as 2P replication. Alternatively, other methods for forming a data surface or standoff surface in a substrate may also be employed.

Once both stampers are created, the system prepares both stampers in an injection mold (246). The replication system injects the substrate material into the mold that creates substrate 218 having data surface 226 and standoff features 224 on opposing sides of the substrate (248). After substrate 218 is cured, the substrate is removed from the mold (250). The system may then complete layers 216 by adding any number of layers needed for the use of the optical disk (252). For example, the user may add thin films 220 to cover data surface 226 and attach substrate 222, which may complete the entire optical disk.

Figure 16:
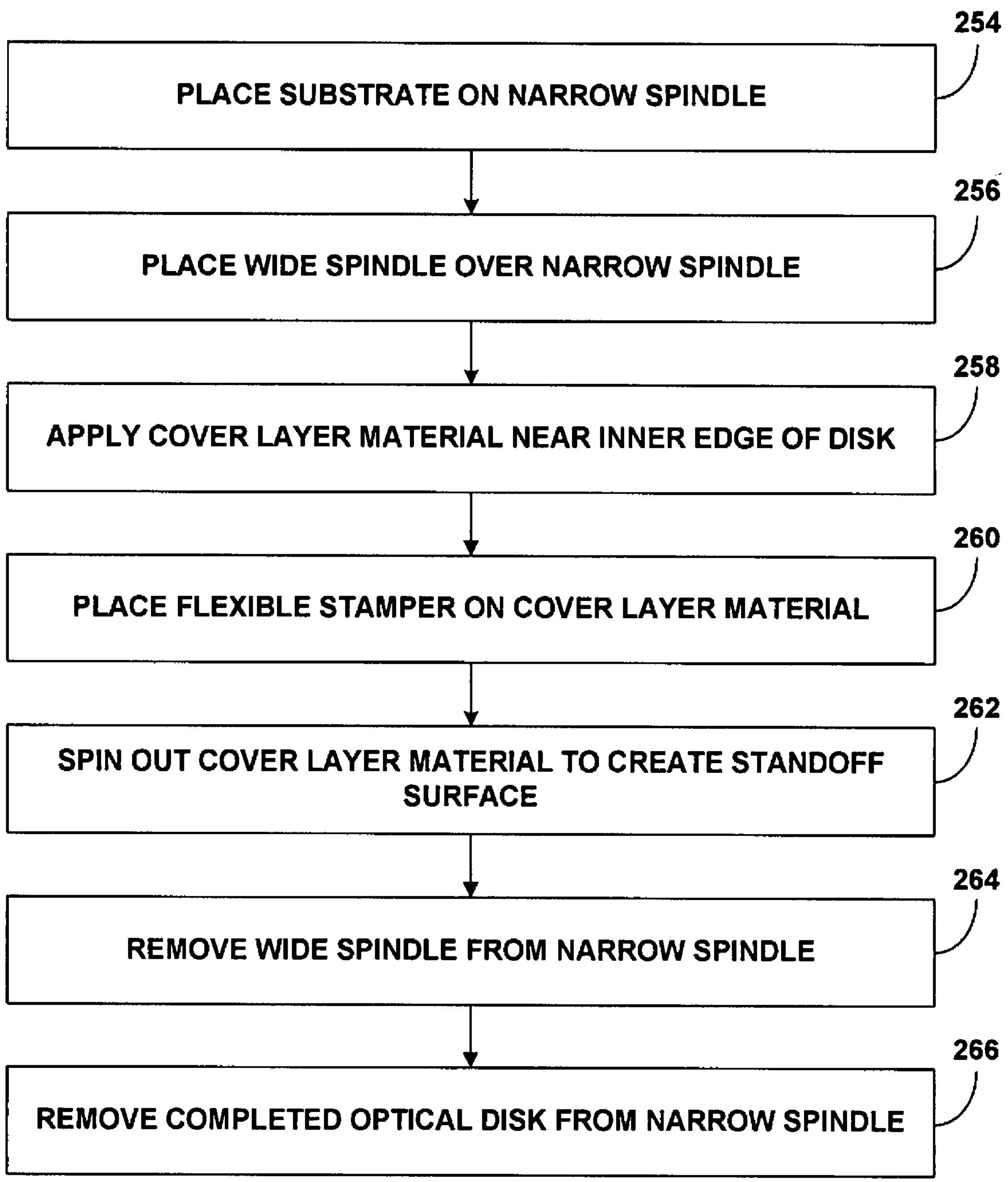
FIG. 16 is a flow diagram illustrating an example method for creating an optical disk with spin-replicated standoff features in a cover layer.

FIG. 16 is a flow diagram illustrating an example method for creating an optical disk with a spin-replicated standoff surface having standoff features. FIG. 16 provides an example technique for creating an optical disk having standoff features. However, other techniques for cover layer bonding, spin-bonding, mold tooling, or creating standoff features of an optical disk may also be used in alternative examples. As shown in FIG. 16, cover layer 208 is added to substrate 210 of layers 206 using the method of FIG. 16 and a spin-replication device of FIG. 7. The method of FIG. 16 is performed by a replication system. However, other examples may utilize multiple devices, systems, or users at one or more facilities to complete the steps of FIG. 16. The replication system first places substrate 210, e.g., a molded disk, onto a narrow spindle with data surface 214 facing upward (254). The system then places the wide spindle over the narrow spindle in order to hold substrate 210 in place (256). In some cases, one or more thin films may be added to substrate 200A prior to adding cover layer 208.

The system may complete the outer surface of layers 206 through the creation of standoff features 212 in cover layer 208 over data surface 214. The replication system applies a cover layer material near the inner layer of substrate 210 (258). The replication system then places a stamper having an inverse standoff surface on the cover layer material (260) and spins the vacuum chuck of the device to spin out or flow the cover layer material between substrate 210 and the stamper (262). Once the cover layer material is cured with UV light through the stamper, the system may remove the wide spindle from the narrow spindle (264). The replication system then removes the completed layers 206 from the narrow spindle ready to be added to one or more other layers, substrates, or cover layers (266).

The method of FIG. 16 may be used in any application where a thin film, cover layer, or other coating is applied to an optical disk for creating a standoff surface with standoff features. After cover layer 208 is cured, the stamper may be able to be lifted off of standoff features 212. In some examples, the stamper may be flexible to facilitate removal from the standoff surface. In alternative examples, the stamper may be used to create standoff features 212 without spin replication. The stamper having the inverse microstructured surface may be applied to a cover layer material using a roll-on embossing method in which the stamper rolls across a malleable surface to create standoff features 212. Other methods may also be used to create standoff features 212 in a layer or material of an optical disk.

Figure 17:
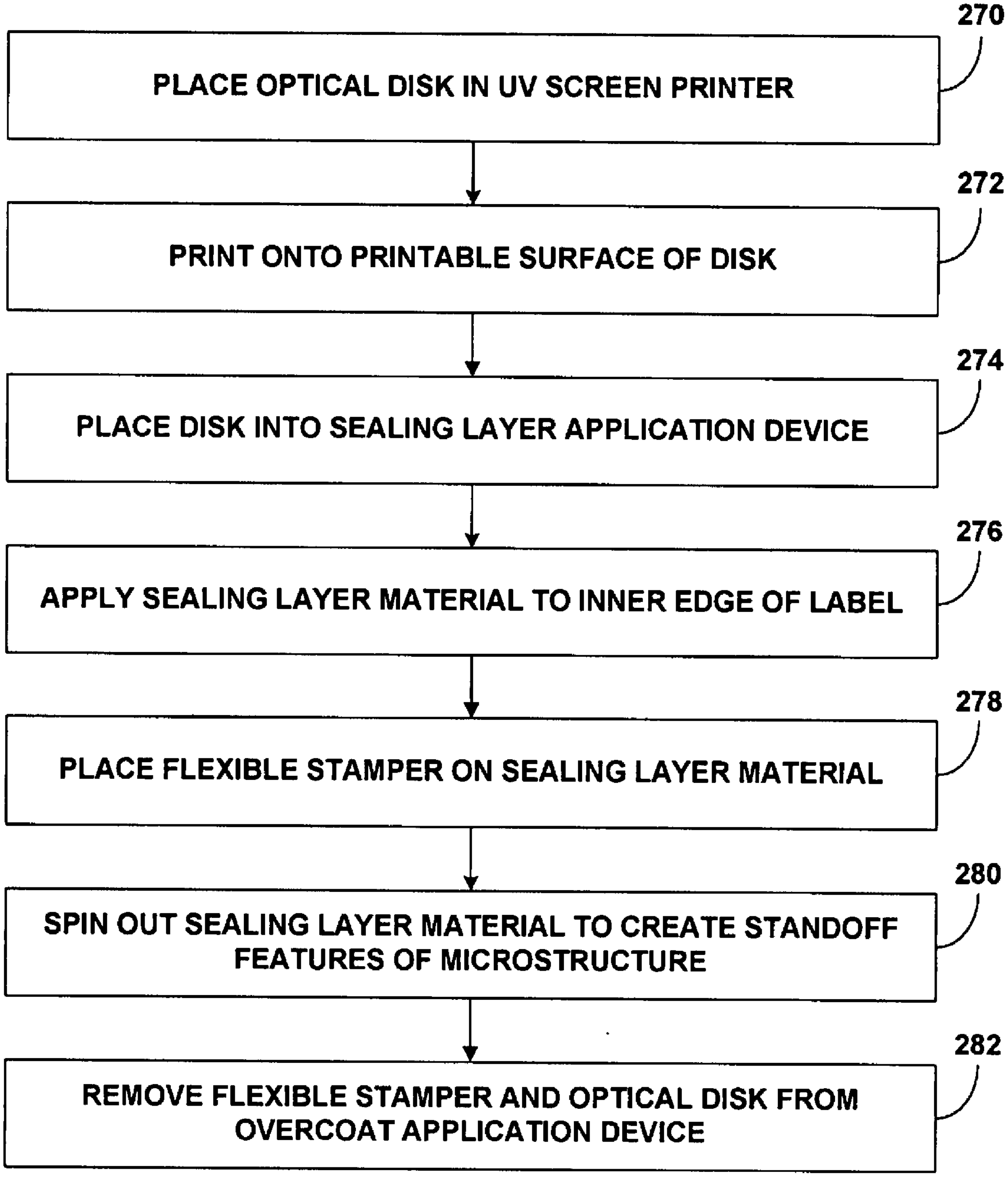
FIG. 17 is a flow diagram illustrating an example method of printing a label onto an optical disk and adding an overcoat material that forms a plurality of standoff features.

FIG. 17 is a flow diagram illustrating an example method of printing a label onto an optical disk and adding a sealing layer having standoff features. As shown in FIG. 17, layers 198A of FIG. 12B is described with print material applied to substrate 200A prior to the addition of sealing layer 202A. However, any optical disk with standoff features may have a label located beneath a sealing layer with standoff features. The method of FIG. 17 is performed by a printer and replication system. However, other examples may utilize multiple devices, systems, or users at one or more facilities to complete the steps of FIG. 17. Layers 198A construction begins with the replication system placing substrate 200A in a UV screen printer (270). The screen printer screen prints a label onto substrate 200A and cures the label with UV energy (272). It is noted that other examples may print a label onto substrate 200A with a different method, such as inkjet printing, thermal printing, lithography, or any other printing method. In addition, substrate 200A may include a microstructured surface that accepts a print material for the label.

Once the label is printed onto substrate 200A, the replication system may place the substrate into a sealing layer application device, such as a spin-replication device (274). The replication system applies a sealing layer material to the inner edge of the label where the sealing layer material later cures into sealing layer 202A (276). The system places the stamper which has an inverse standoff features structure on the sealing layer material (278). The device spins substrate 200A such that the sealing layer material spreads out over the label between the stamper (280). The device cures the sealing layer material to sealing layer 202A with standoff features 204A and removes the stamper and layers 198A from the device (282). In other examples, the stamper may be used to roll-emboss sealing layer 202A onto substrate 200A.

Stampers are described herein as a tool for creating microstructured surfaces and standoff features in substrates, sealing layers, or other surfaces. Stampers include an inverse microstructured surface that is a mirror image of the microstructured surface to be formed in a layer of the optical disk. The microstructured surfaces may be created to accept a print material and standoff features are created to prevent scratches from occurring in the surface on the optical disk. However, stampers are replicated from a master stamper, which includes an identical microstructured surface to the microstructured surface included in an optical disk. The master stamper may be generated via many different techniques and used to create replicated stampers. These techniques may include inkjet lithography, diffuse surface casting, galvanic plating replication, photoresist etching, ashed PMMA texture, or any other method of creating a microstructured surface or standoff features. Some of these methods are described below.

Inkjet lithography uses ink droplets to create the microstructured surface or standoff features. An example use includes an inkjet printer that prints a randomized array of 10-40 μm droplets onto a disk surface. Droplet size may vary with densities of different colors of ink. An anti-fingerprint surface may be used to form smaller and tighter spheres of ink with the droplets. The ink droplets are then overcoated with a thin metal film, e.g., Ni, Al, or Cr. A film thickness between 5 nanometers (nm) and 20 nm may be formed under vacuum coating. Ink patterned regions are then removed to reveal a metal mask layer with a random array of droplet holes. A plasma ashing process then etches in the disk surface to a depth through the metal mask. Alternative etching methods may include chemical methods to provide more isotropic and more directional etch profiles with a much deeper structure. Once the sublayer etching is completed, the thin film may be cleared with an etchant solution to finalize the master stamper.

In other examples, crystal surface casting may utilize UV replication of a current diffuse or anodized surface. A diffuse surface may be porous with a low density of smaller dimensioned fissures. A metalized or cast surface may be created to form the microstructured surface or standoff features of the master stamper.

In alternative examples, galvanic plating replication uses a controllable texture of a Nickel electroplating process that may start with a low current stage for creating stampers from the master stamper. The low current stage may be useful in forming a dense, smooth surface from the master. The remaining thickness of a typical stamper is ramped up to a high speed plating step. The high speed plating step may form varying levels of roughness, or microstructured surface, on the final surface of the replicated stamper.

Various embodiments of the invention have been described. For example, a microstructured surface was created on a surface of an optical disk to accept print material for a label. In addition, standoff features are formed in an outer surface of an optical disk to prevent scratches to the outer surface of the optical disk. The microstructured surfaces may allow for a less expensive manufacturing method and/or operational advantages. Nevertheless various modifications can be made to the techniques described herein without departing from the spirit and scope of the invention. For example, laser mastering may be used to create a master stamper having a microstructured surface. These and other embodiments are within the scope of the following claims.

The invention claimed is:

1. An optical disk comprising:

a disk-shaped substrate that is formed via an injection molding process;

an injection molded data surface formed when the disk-shaped substrate is injection molded; and an injection molded microstructured surface configured to accept a print material and formed when the disk-shaped substrate is injection molded.

2. The optical disk of claim 1, wherein the injection molded microstructured surface is formed in a first surface of the disk-shaped substrate when the disk-shaped substrate is injection molded.

3. The optical disk of claim 2, wherein the injection molded data surface is formed in a second surface of the disk-shaped substrate when the disk-shaped substrate is injection molded.

4. The optical disk of claim 1, wherein the injection molded microstructured surface is configured to prevent the print material from migrating across the outer surface.

5. The optical disk of claim 1, wherein the injection molded microstructured surface defines a plurality of wells.

6. The optical disk of claim 1, wherein the injection molded microstructured surface defines a plural plurality of discontinuous raised features.

7. The optical disk of claim 1, wherein the print material is at least one of an ink and a thermally applied layer.

8. The optical disk of claim 1, wherein features of the injection molded microstructured surface have a spacing between 0.5 micrometers and 200 micrometers.

9. The optical disk of claim 1, further comprising injection molded standoff features formed in the injection molded microstructured surface, wherein the injection molded standoff features protrude from the injection molded microstructured surface to protect the injection molded microstructured surface from damage.

10. An optical disk comprising:

a disk-shaped substrate that is formed via an injection molding process;

an injection molded data surface formed when the disk-shaped substrate is injection molded;

an injection molded microstructured surface configured to accept a print material and formed when the disk-shaped substrate is injection molded; and a print material adhered to the injection molded microstructured surface, wherein the injection molded microstructured surface reduces migration of the print material across the injection molded microstructured surface.

11. The optical disk of claim 10, wherein the print material is an ink captured within a plurality of wells defined by the injection molded microstructured surface.

12. The optical disk of claim 10, wherein the print material is a thermal layer adhered to a plurality of features defined by the injection molded microstructured surface.

13. The optical disk of claim 10, wherein features of the injection molded microstructured surface have a spacing between 0.5 micrometer and 200 micrometers.

14. A method comprising:

injection molding a disk-shaped substrate of an optical disk;

creating an injection molded data surface for the optical disk during the injection molding of the disk-shaped substrate; and forming an injection molded microstructured surface into an outer surface of the optical disk during the injection molding of the disk-shaped substrate with a stamper that includes a stamper surface that defines an inverse pattern relative to the injection molded microstructured surface, wherein the injection molded microstructured surface is configured to accept a print material.

15. The method of claim 14, further comprising applying the print material to the injection molded microstructured surface of the outer surface, wherein the injection molded microstructured surface reduces migration of the print material across the microstructured surface.

16. The method of claim 14, wherein forming the injection molded microstructured surface comprises molding the injection molded microstructured surface into a first surface of the disk-shaped substrate with the stamper when injection molding the disk-shaped substrate.

17. The method of claim 16, wherein creating the injection molded data surface comprises molding the injection molded data surface into a second surface of the disk-shaped substrate when injection molding the disk-shaped substrate.

18. An optical disk comprising:

a disk-shaped substrate that is formed via an injection molding process;

an injection molded data surface formed when the disk-shaped substrate is injection molded; and a plurality of injection molded standoff features formed in an outer surface of the disk at the same radial position of at least a portion of the data surface, wherein the plurality of injection molded standoff features are formed when the disk-shaped substrate is injection molded, protrude from the disk-shaped substrate and protect the outer surface from damage.

19. The optical disk of claim 18, wherein:

the disk-shaped substrate defines a first inner radius and a first outer radius;

the injection molded data surface defines a second inner radius and a second outer radius; and the plurality of injection molded standoff features are formed between the second inner radius and the second outer radius.

20. The optical disk of claim 18, wherein the outer surface is a surface of the disk-shaped substrate.

21. The optical disk of claim 18, further comprising an injection molded microstructured surface formed in the outer surface between the plurality of injection molded standoff features, wherein the injection molded microstructured surface defines at least one of a plurality of injection molded wells and a plurality of injection molded discontinuous raised features between the plurality of injection molded standoff features.

22. The optical disk of claim 18, further comprising a print material receptive layer adhered to the outer surface between the plurality of injection molded standoff features.

23. The optical disk of claim 18, wherein the plurality of injection molded standoff features cover less than one percent of a surface area between the second inner radius and the second outer radius.

24. The optical disk of claim 18, wherein the injection molded standoff features extend between 0.1 micrometer and 20 micrometers from the outer surface.

* * * * *

UNITED STATES PATENT AND TRADEMARK OFFICE

CERTIFICATE OF CORRECTION

PATENT NO. : 7,861,255 B2
APPLICATION NO. : 11/805309
DATED : December 28, 2010
INVENTOR(S) : Jathan D. Edwards It is certified that error appears in the above-identified patent and that said Letters Patent is hereby corrected as shown below:

Column 23, line 14 (Claim 6): "defines a plural plurality" should read -- defines a plurality --

Signed and Sealed this
Fourth Day of October, 2011

David J. Kappos
*Director of the United States Patent and Trademark Office*